(12) United States Patent
Sekiya

(10) Patent No.: US 7,567,077 B2
(45) Date of Patent: Jul. 28, 2009

(54) NON-CONTACT POSITION SENSOR

(75) Inventor: Mitsuru Sekiya, Odawara (JP)

(73) Assignee: Mikuni Corp. (JP)

( * ) Notice: Subject to any disclaimer, the term of this patent is extended or adjusted under 35 U.S.C. 154(b) by 0 days.

(21) Appl. No.: 10/595,024

(22) PCT Filed: Jun. 17, 2004

(86) PCT No.: PCT/JP2004/008526

§ 371 (c)(1),
(2), (4) Date: Dec. 20, 2005

(87) PCT Pub. No.: WO2004/113845

PCT Pub. Date: Dec. 29, 2004

(65) Prior Publication Data

US 2006/0170416 A1 Aug. 3, 2006

(30) Foreign Application Priority Data

Jun. 20, 2003 (JP) .................... P2003-176083

(51) Int. Cl.
*G01B 7/14* (2006.01)
*G01B 7/30* (2006.01)
*G01R 33/06* (2006.01)

(52) U.S. Cl. ............................ 324/207.22; 324/207.24; 324/207.2; 324/207.15

(58) Field of Classification Search .............. 324/207.2, 324/207.25, 207.24, 207.11, 207.16, 207.15, 324/207.13, 207.12, 207.22, 207.26, 228; 701/41; 318/135; 310/12, 13, 254
See application file for complete search history.

(56) References Cited

U.S. PATENT DOCUMENTS

| 5,532,585 A * | 7/1996 | Oudet et al. ........... 324/207.22 |
| 6,518,749 B1 * | 2/2003 | Oudet et al. ............. 324/207.2 |
| 6,559,637 B2 * | 5/2003 | Miyata et al. ........... 324/207.2 |
| 6,577,119 B1 | 6/2003 | Yaddehige |
| 2003/0137293 A1 | 7/2003 | Welsch et al. |

FOREIGN PATENT DOCUMENTS

| JP | 5984404 | 6/1984 |
| JP | 7500421 | 1/1995 |
| JP | 200174409 | 3/2001 |
| JP | 200328605 | 1/2003 |
| JP | 2003315088 | 11/2003 |

* cited by examiner

*Primary Examiner*—Reena Aurora
(74) *Attorney, Agent, or Firm*—Kilpatrick Stockton LLP

(57) ABSTRACT

The length in the direction of movement of a magnet is effectively used for position detection without using a gap of a stator, where the magnet moves, as a magnetic path. According to a proportion of the slider (110), having a magnet (111), that enters into a region where the slider is movable with a predetermined gap maintained between the stator (120) made from a magnetic body, a magnetism sensor (130) provided at a stator (120) detects the position of a slider (110). A magnetic flux leakage prevention member (140) prevents leakage of magnetic flux caused by that portion of the magnet (111) that has not entered in the region.

4 Claims, 25 Drawing Sheets

(a)

(b)

(a)

(b)

(a)

(b)

(a)

(b)

(a)

(b)

(a)

(b)

(a)

(b)

(c)

(a)

(b)

(a)

(b)

(c)

(a)

(b)

(a)

(b)

(c)

NON-CONTACT POSITION SENSOR

TECHNICAL FIELD

The present invention relates to a non-contact position sensor, for example, a position sensor used for an EGR (Exhaust Gas Recirculation) control valve, which is applicable as a position sensor used in a variety of actuators.

BACKGROUND OF ART

In prior art, there was used a contact type position sensor having a resistive element and a brush slipping on the resistive element, as the position sensor used in the EGR control valve. Recently, it has been required that such a position sensor is used under severer working circumstances or for years.

Against such requirements, however, the contact type position sensor has possibilities of occurrence of silicon compounds due to irruption of siloxane gas, sticking of abrasion powder caused by the brush acting minutely at high-G frequencies, or obstructed positional detection due to increasing of contact resistance caused by the sticking of abrasion powder on a contact area of the brush.

Additionally, as the brush slides on a resistant layer, abrasion of a sliding area is unavoidable, so that there is a limit in the number of operations of the sensor.

Therefore, according to the conventional contact type position sensor, it is difficult to meet the above requirements.

In this view, the need of employing a non-contact type position sensor having no contact area has been increased.

As the non-contact sensor like this, a sensor using a hall sensor has been developed. Thus, there are one sensor that utilizes a magnet formed with one pole in a moving direction and further uses, as a magnetic path, a gap of a stator where the magnet moves as described in Japanese Patent Publication No. 3264929, and another sensor that utilizes a magnet formed with two poles (N, S) in a moving direction and arranges a stator so to oppose one side of the magnet as described in Japanese Patent Laid-Open No. 2001-74409.

DISCLOSURE OF THE INVENTION

In the former non-contact sensor, however, it is necessary to narrow the gap of the stator, which is utilized as a magnetic path, as possible because a broader gap of the stator would accelerate an escape of magnetic flux. However, if narrowing the gap of the stator, then the magnet becomes thin to cause its magnetic force to be reduced.

Consequently, it is required to adopt a rare-earth sintered magnet having strong magnetic force as the magnet for sensor. Thus, there exist problems that the magnet is elevated in its cost and is breakable for vibrations due to its thinness. Additionally, it is difficult to combine a magnet with a shaft for detecting the position.

In the latter non-contact sensor, its usable range is shortened in relation to a moving span of the magnet due to an insensible zone between two (N and S) poles. Additionally, if the sensor is provided with a single-loop structure in view of shortening the moving span, then a splice in characteristics is produced in the vicinity of a center in the moving direction, making linearity in characteristics worse.

In order to solve the above-mentioned problems, an object of the present invention is to provide a non-contact position sensor capable of effectively using a length of a magnet in its moving direction in order to detect a position of the magnet with no use of a gap between the magnet and a stator as a magnetic path.

According to a first aspect of the present invention, a non-contact position sensor comprises: a slider having a magnet; a stator consisting of a magnetic body having an area allowing the slider to move while keeping a predetermined clearance; a magnetically-sensitive sensor provided in the stator to detect a position of the slider corresponding to a percentage of the magnet entering the area; and a magnetic flux leakproof member for preventing magnetic flux, which is generated in a part of the magnet that does not enter the area, from leaking out to the stator.

According to a second aspect of the present invention, a non-contact position sensor comprises: a slider having a magnet having its front and back faces whose polarities are different from each other; a stator consisting of a magnetic body having a pair of opposed walls forming an area allowing the slider to move while keeping a predetermined clearance, the opposed walls corresponding to the front and back faces of the magnet; a magnetically-sensitive sensor provided in the stator to detect a position of the slider corresponding to a percentage of the magnet entering the area; and a magnetic flux leakproof member for preventing magnetic flux, which is generated in a part of the magnet that does not enter the area, from leaking out to the stator.

According to a third aspect of the present invention, a non-contact position sensor comprises: a slider having a magnet having its front and back faces whose polarities are different from each other; a main stator consisting of a magnetic body having a pair of opposed walls forming an area allowing the slider to move while keeping a predetermined clearance, the opposed walls corresponding to the front and back faces of the magnet, and a gap continuing into the opposed walls; a magnetically-sensitive sensor arranged in the gap to detect a position of the slider corresponding to a percentage of the magnet entering the area; and an assist stator for preventing magnetic flux, which is generated in a part of the magnet that does not enter the area, from leaking out to the main stator.

According to a fourth aspect of the present invention, a non-contact position sensor comprises: a slider having a magnet having its front and back faces whose polarities are different from each other; a main stator consisting of a magnetic body having a pair of opposed walls forming a first area allowing the slider to move while keeping a predetermined clearance, the opposed walls corresponding to the front and back faces of the magnet, and a gap continuing into the opposed walls; an assist stator arranged at a gap extending along a moving direction of the slider from the main stator, the assist stator consisting of a magnetic body having a pair of opposed walls forming a second area allowing the slider to move while keeping a predetermined clearance; and a magnetically-sensitive sensor arranged in the gap of the main stator to detect a position of the slider corresponding to a percentage of the magnet entering the first area of the main stator.

According to a fifth aspect of the present invention, a non-contact position sensor comprises: a slider having a magnet having its front and back faces whose polarities are different from each other; a main stator consisting of a magnetic body having a pair of opposed walls forming a first area allowing the slider to move while keeping a predetermined clearance, the opposed walls corresponding to the front and back faces of the magnet, and a pair of transverse walls formed to extend from the opposed walls and arranged close to each other through a uniform gap along a moving direction of the slider; an assist stator arranged at a gap extending along the moving direction of the slider from the main stator, the assist stator consisting of a magnetic body having a pair of opposed walls forming a second area allowing the slider to move while keeping a predetermined clearance, the opposed walls corresponding to the front and back faces of the magnet; and a magnetically-sensitive sensor arranged in an optional position in the gap of the main stator to detect a position of the slider corresponding to a percentage of the magnet entering the first area of the main stator.

According to a sixth aspect of the present invention, a non-contact position sensor comprises: a slider having a magnet having its front and back faces whose polarities are different from each other; a main stator consisting of a magnetic body having a pair of opposed walls forming a first area allowing the slider to move while keeping a predetermined clearance, the opposed walls corresponding to the front and back faces of the magnet, and a transverse arm formed to extend from one of the opposed walls and arranged close to the other of the opposed walls through a uniform gap along a moving direction of the slider; an assist stator arranged at a gap extending along the moving direction of the slider from the main stator, the assist stator consisting of a magnetic body having a pair of opposed walls forming a second area allowing the slider to move while keeping a predetermined clearance, the opposed walls corresponding to the front and back faces of the magnet; and a magnetically-sensitive sensor arranged in an optional position in the gap of the main stator to detect a position of the slider corresponding to a percentage of the magnet entering the first area of the main stator.

According to a seventh aspect of the present invention, a non-contact position sensor comprises: a slider having a magnet having its front and back faces whose polarities are different from each other; a main stator consisting of a magnetic body having a pair of opposed walls forming a first area allowing the slider to move while keeping a predetermined clearance, the opposed walls corresponding to the front and back faces of the magnet, a first arm formed to extend from one of the opposed walls and arranged close to the other of the opposed walls through a uniform gap along a moving direction of the slider and a second arm formed to extend from the other of the opposed walls and arranged close to the one of the opposed walls through a uniform gap along a moving direction of the slider; an assist stator arranged at a gap extending along the moving direction of the slider from the main stator, the assist stator consisting of a magnetic body having a pair of opposed walls forming a second area allowing the slider to move while keeping a predetermined clearance, the opposed walls corresponding to the front and back faces of the magnet; and a magnetically-sensitive sensor arranged in an optional position in the gap between the first arm and the other of the opposed walls to detect a position of the slider corresponding to a percentage of the magnet entering the first area of the main stator.

According to an eighth aspect of the present invention, a non-contact position sensor comprises: a slider consisting of a pair of magnets whose side edges along a moving direction of the slider are joined to each other and each of which has front and back faces whose polarities are different from each other and an armature provided on one side face of the pair of magnets; a main stator consisting of a magnetic body arranged in a position opposing the other side face of the pair of magnets; a magnetically-sensitive sensor provided in the main stator to detect a position of the slider corresponding to a percentage of the magnets entering an area where the slider opposes the main stator; and an assist stator consisting of a magnetic body for preventing magnetic flux, which is generated in parts of the magnets that do not enter the area, from leaking out to the main stator.

BRIEF DESCRIPTION OF THE DRAWINGS

FIG. 1 is views typically showing a non-contact position sensor in accordance with a first embodiment of the present invention, in which FIG. 1(a) is a perspective view, FIG. 1(b) is a front view and FIG. 1(c) is a side view;

FIG. 3 is typical views showing a difference in situation of flux in between one case of having an assist stator and another case of having no assist stator, in which FIG. 3(a) illustrates the case of having the assist stator and FIG. 3(b) illustrates the case of having no assist stator;

FIG. 4 is typical views showing a difference in situation of flux in between an integral-type assist stator having no gap and a separation-type assist stator having a gap, in which FIG. 4(a) illustrates a case of the integral-type assist stator having no gap and FIG. 4(b) illustrates a case of the separation-type assist stator having the gap;

FIG. 5 is graphs about a quantity of magnetism of a sensing part and linearity corresponding to the presence of an assist stator, in which FIG. 5(a) illustrates the quantity of magnetism of the sensing part and FIG. 5(b) illustrates the linearity;

FIG. 10 is graphs showing a comparison of output characteristics of a sensor using an integral-type assist stator with output characteristics of a sensor using a separation-type assist stator, in which FIG. 10(a) shows the output characteristics adopting the integral-type assist stator and FIG. 10(b) shows the output characteristics adopting the separation-type assist stator;

In sensors where each detecting position thereof is deviated from a center of a main stator, FIG. 11 is graphs showing a comparison of hysteresis characteristics of a sensor using an integral-type assist stator with hysteresis characteristics of a sensor using a separation-type assist stator, in which FIG. 11(a) shows the hysteresis characteristics adopting the integral-type assist stator and FIG. 11(b) shows the hysteresis characteristics adopting the separation-type assist stator;

In sensors where each detecting position thereof is established at a center of a main stator, FIG. 12 is graphs showing a comparison of hysteresis characteristics of a sensor using an integral-type assist stator with hysteresis characteristics of a sensor using a separation-type assist stator, in which FIG. 12(a) shows the hysteresis characteristics adopting the integral-type assist stator and FIG. 12(b) shows the hysteresis characteristics adopting the separation-type assist stator;

FIG. 13(c) is a cross sectional bottom view of the non-contact position sensor of FIG. 13;

In sensors where each main arm thereof has a width equal to that of an auxiliary arm, FIG. 17 is graphs showing a comparison of hysteresis characteristics of a sensor using an integral-type assist stator with hysteresis characteristics of a sensor using a separation-type assist stator, in which FIG. 17(a) shows the hysteresis characteristics adopting the integral-type assist stator and FIG. 17(b) shows the hysteresis characteristics adopting the separation-type assist stator;

Figure 18:
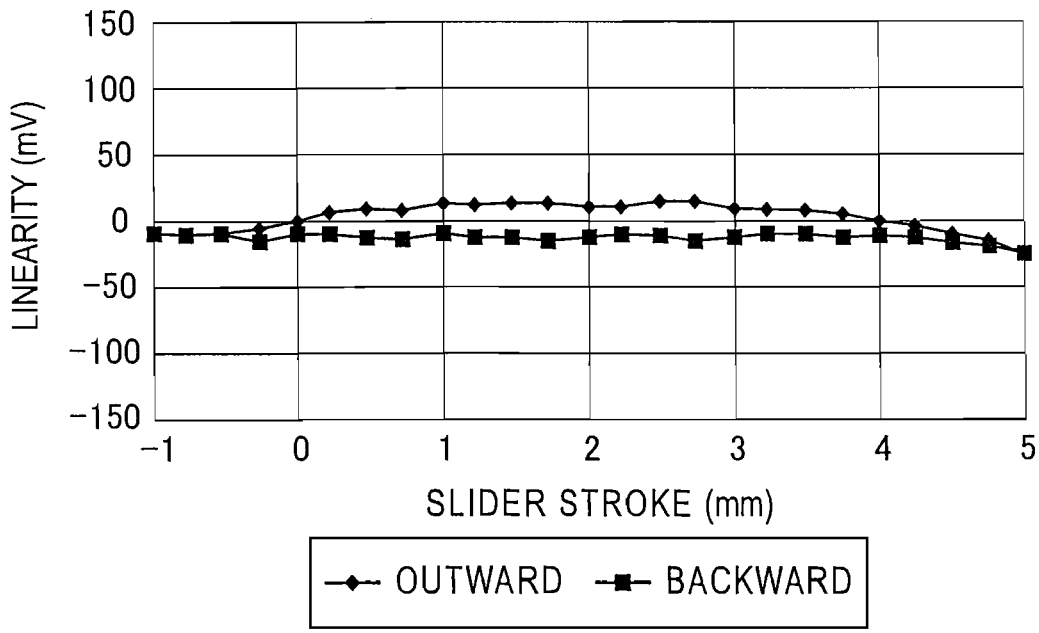
Figure 19:
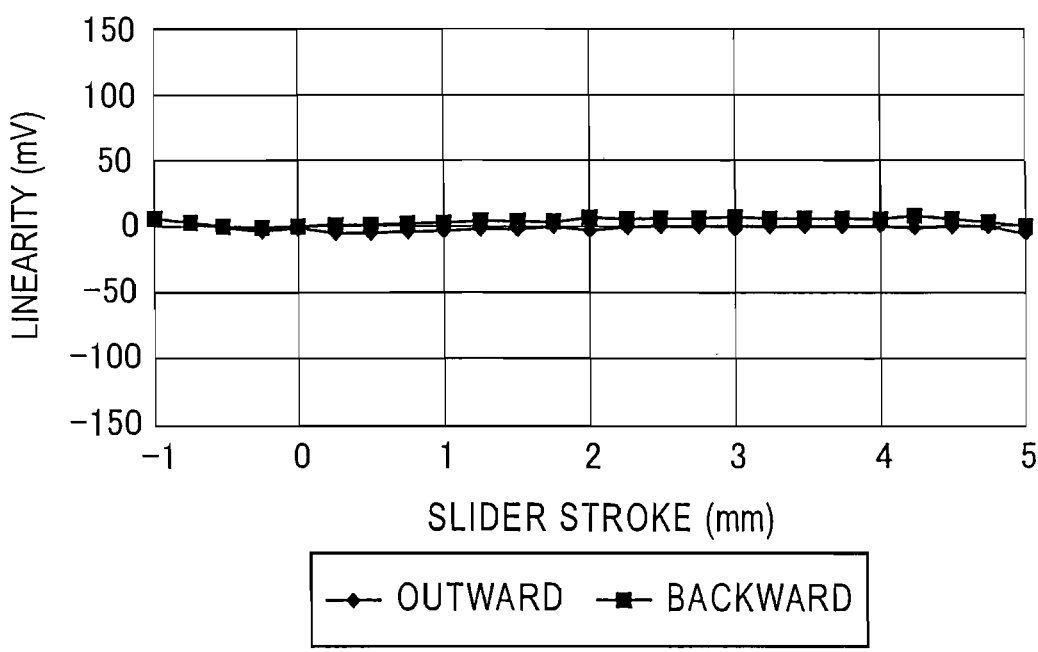
Figure 20:
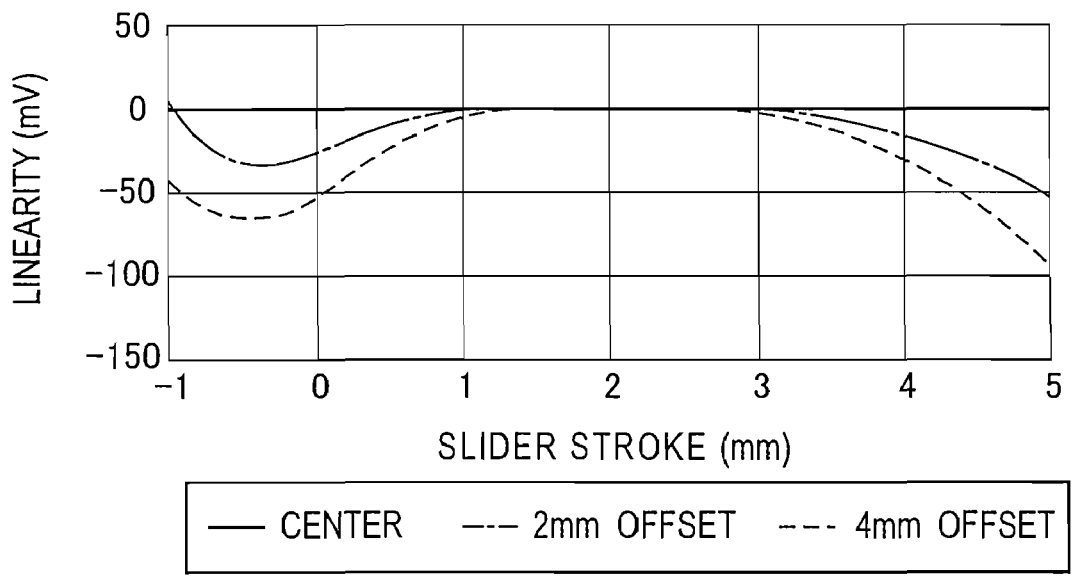
Figure 21:
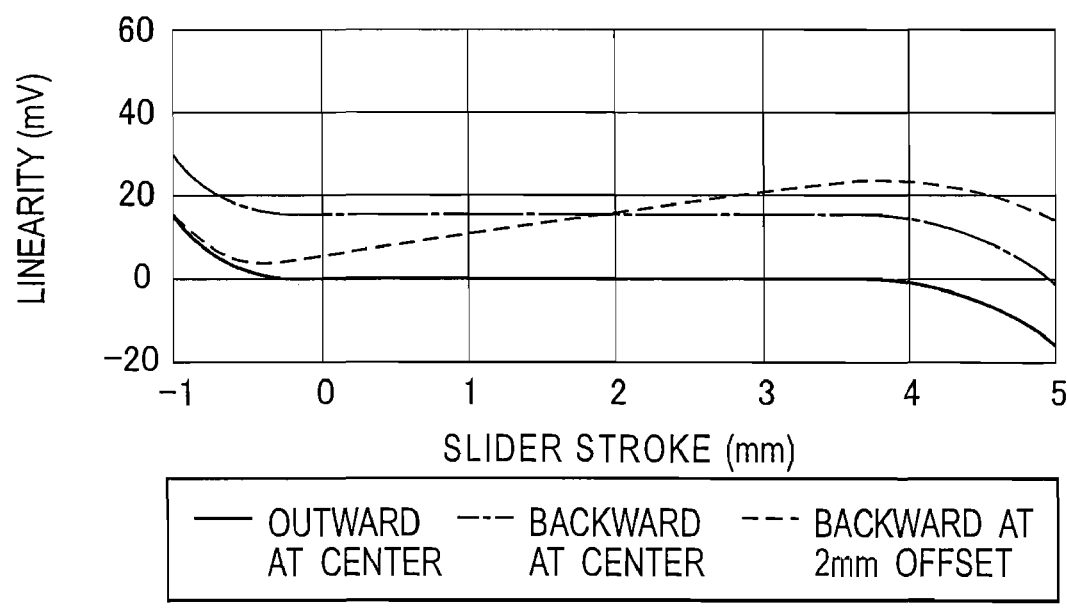
Figure 22:
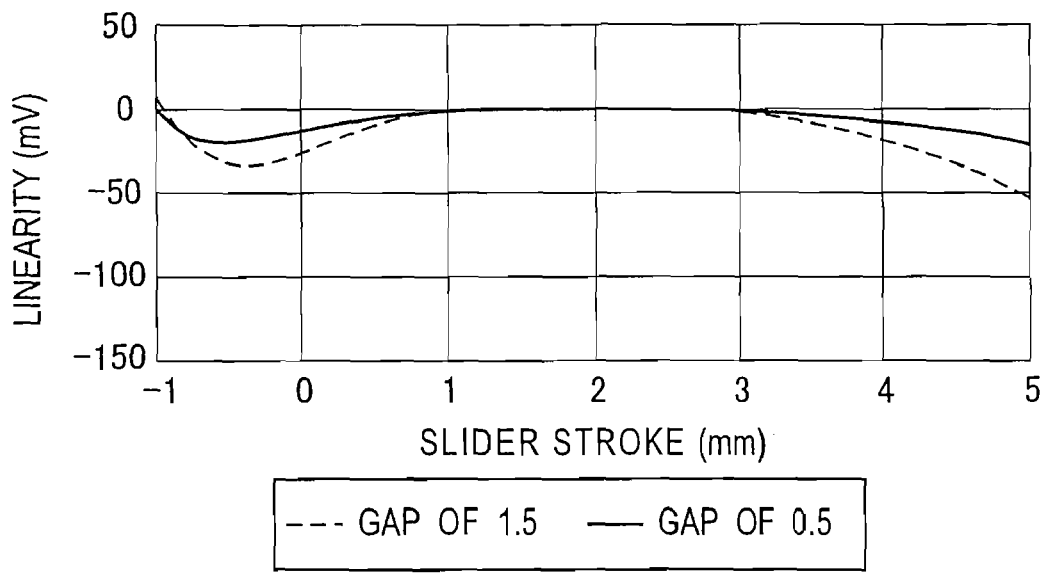
Figure 23:
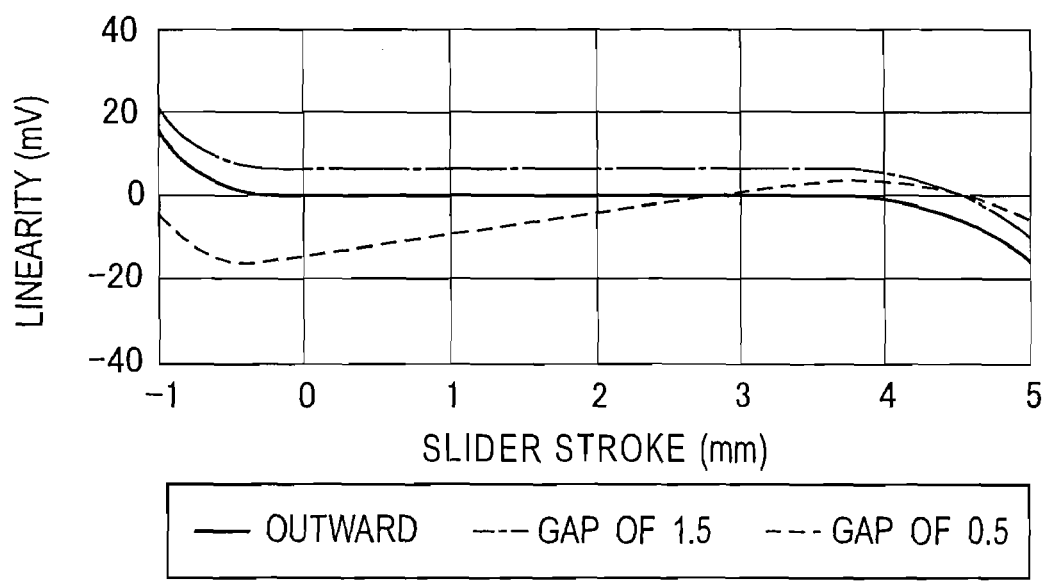
Figure 24:
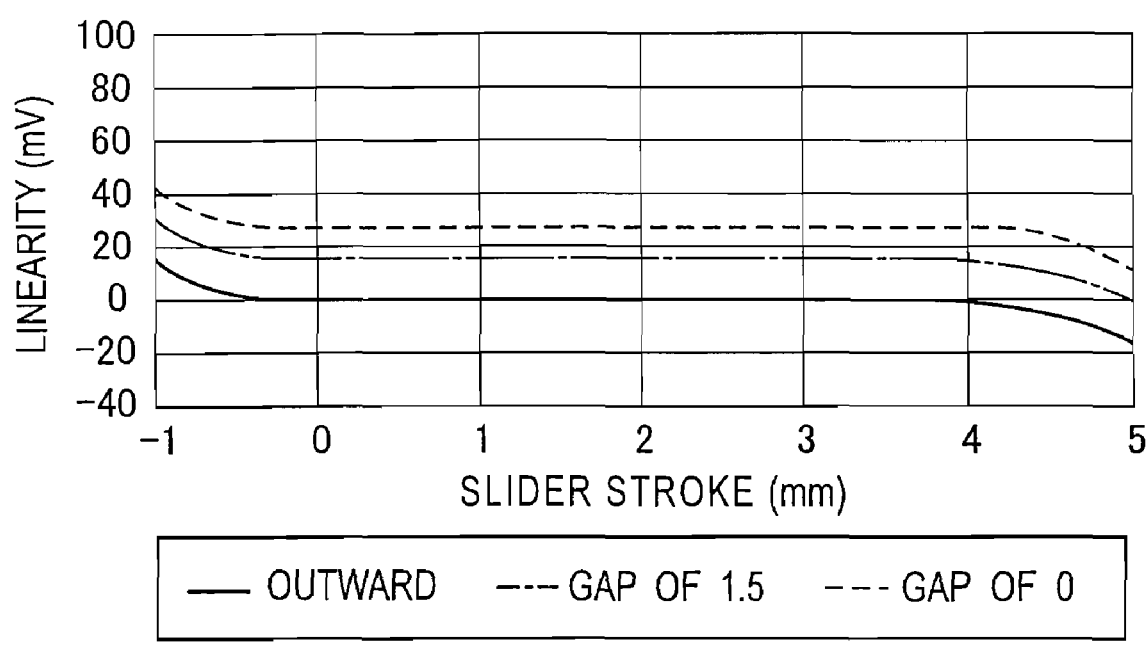
Figure 25:
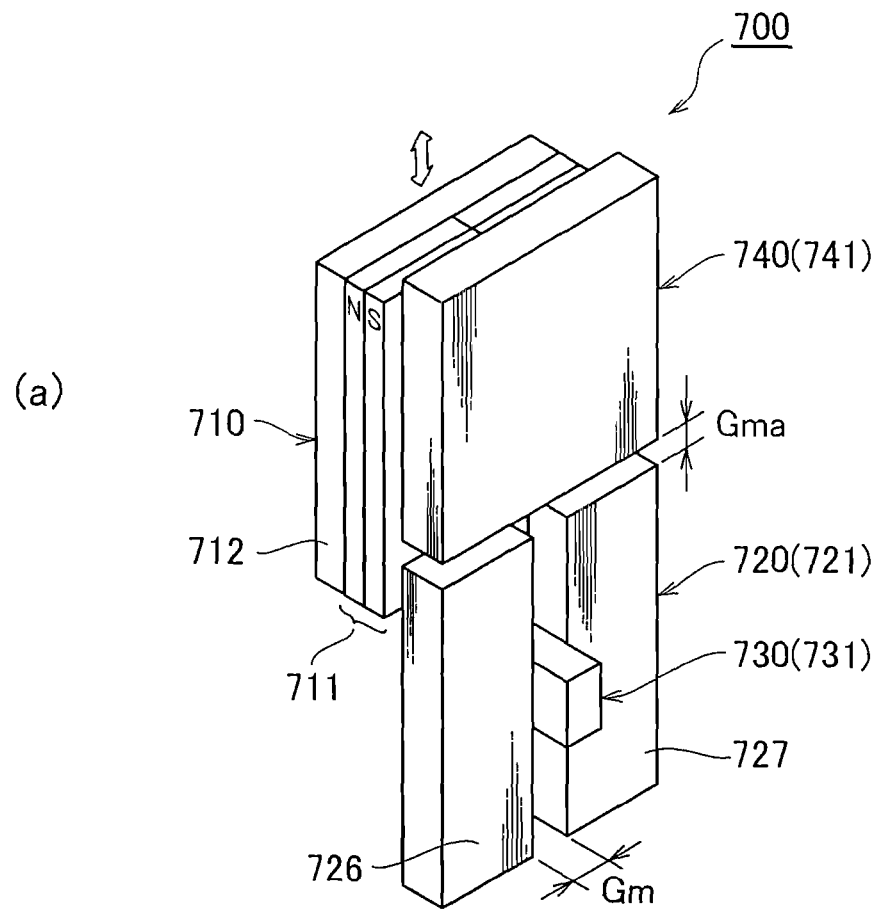
Figure 25:
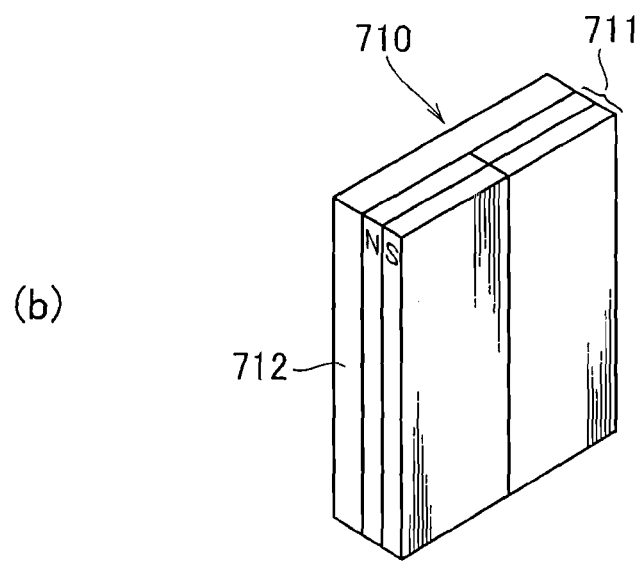
Figure 27:
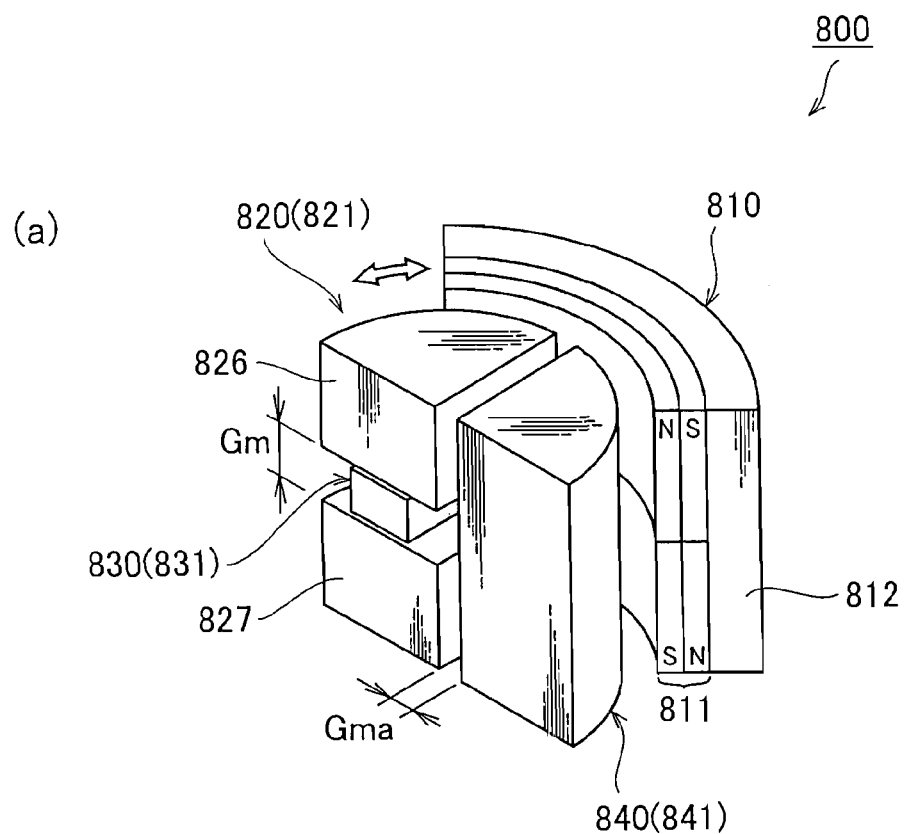
Figure 27:
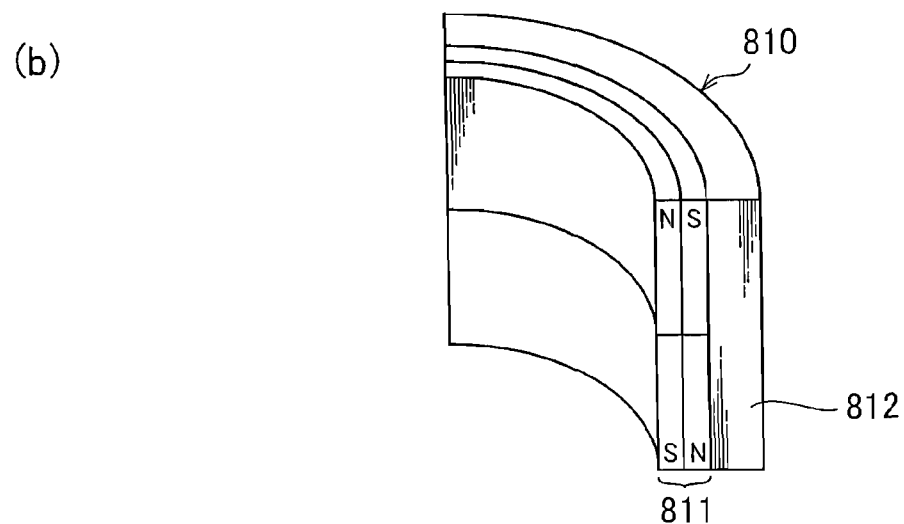
Figure 28:
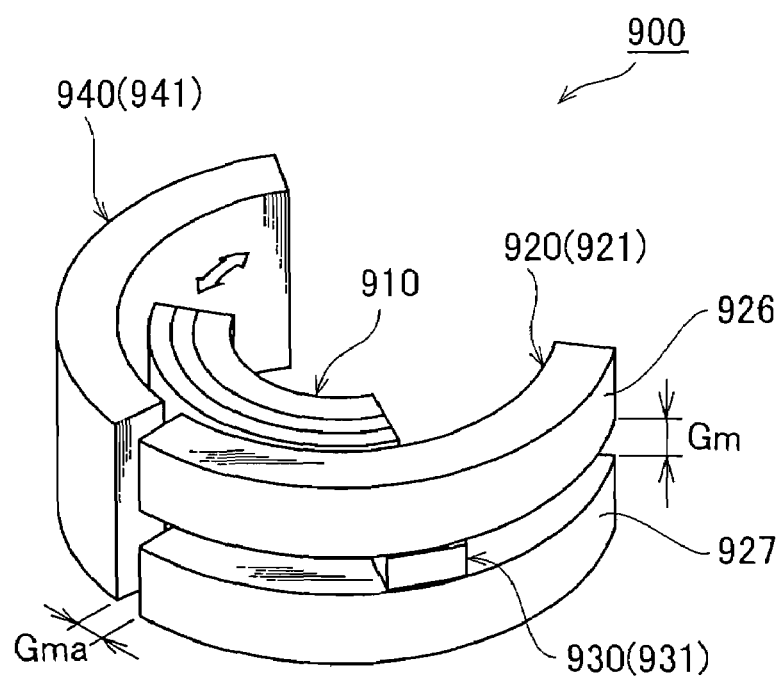
Figure 28:
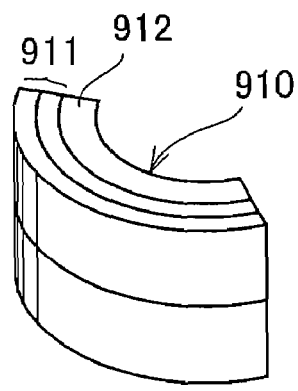
Figure 28:
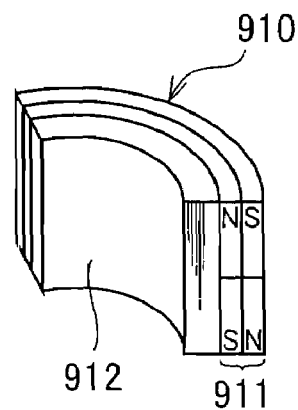

In the sensor using the separation-type assist stator shown in FIG. 17(b),

FIG. 18 is a graph showing the hysteresis characteristics of the sensor where the width of the auxiliary arm is narrowed;

In the sensor using the separation-type assist stator shown in FIG. 17(b),

FIG. 19 is a graph showing the hysteresis characteristics of the sensor where an interval between the main arm and the auxiliary arm is narrowed;

FIG. 20 is an explanatory diagram showing a tendency about an effect of a position of a detecting part on linearity;

FIG. 21 is an explanatory diagram showing a tendency about a relationship between the position of the detecting part and hysteresis;

FIG. 22 is an explanatory diagram showing a tendency about an effect of a gap between a main stator and an assist stator on linearity;

FIG. 23 is an explanatory diagram showing a tendency about a relationship between the gap between the main stator and the assist stator, and hysteresis;

FIG. 24 is an explanatory diagram showing a tendency about a relationship between a gap of the assist stator and hysteresis;

FIG. 25 is views typically showing the non-contact position sensor in accordance with a seventh embodiment of the present invention, in which FIG. 25(a) is an entire perspective view of the sensor and FIG. 25(b) is a perspective view of a substantial part of the sensor;

FIG. 26(a) is a top view of the non-contact position sensor of FIG. 25, FIG. 26(b) is a side view of the non-contact position sensor of FIG. 25 and FIG. 26(c) is a bottom view of the non-contact position sensor of FIG. 25;

FIG. 27 is views typically showing the non-contact position sensor having its part developed, in accordance with an eighth embodiment of the present invention, in which FIG. 27(a) is an entire perspective view of the sensor and FIG. 27(b) is a perspective view of a substantial part of the sensor; and FIG. 28 is views typically showing the non-contact position sensor having its part developed, in accordance with a ninth embodiment of the present invention, in which FIG. 28(a) is an entire perspective view of the sensor and FIGS. 28(b) and 28(c) are perspective views of a substantial part of the sensor.

BEST MODE FOR CARRYING OUT THE INVENTION

Embodiments of the present invention will be described with reference to drawings.

Figure 1:
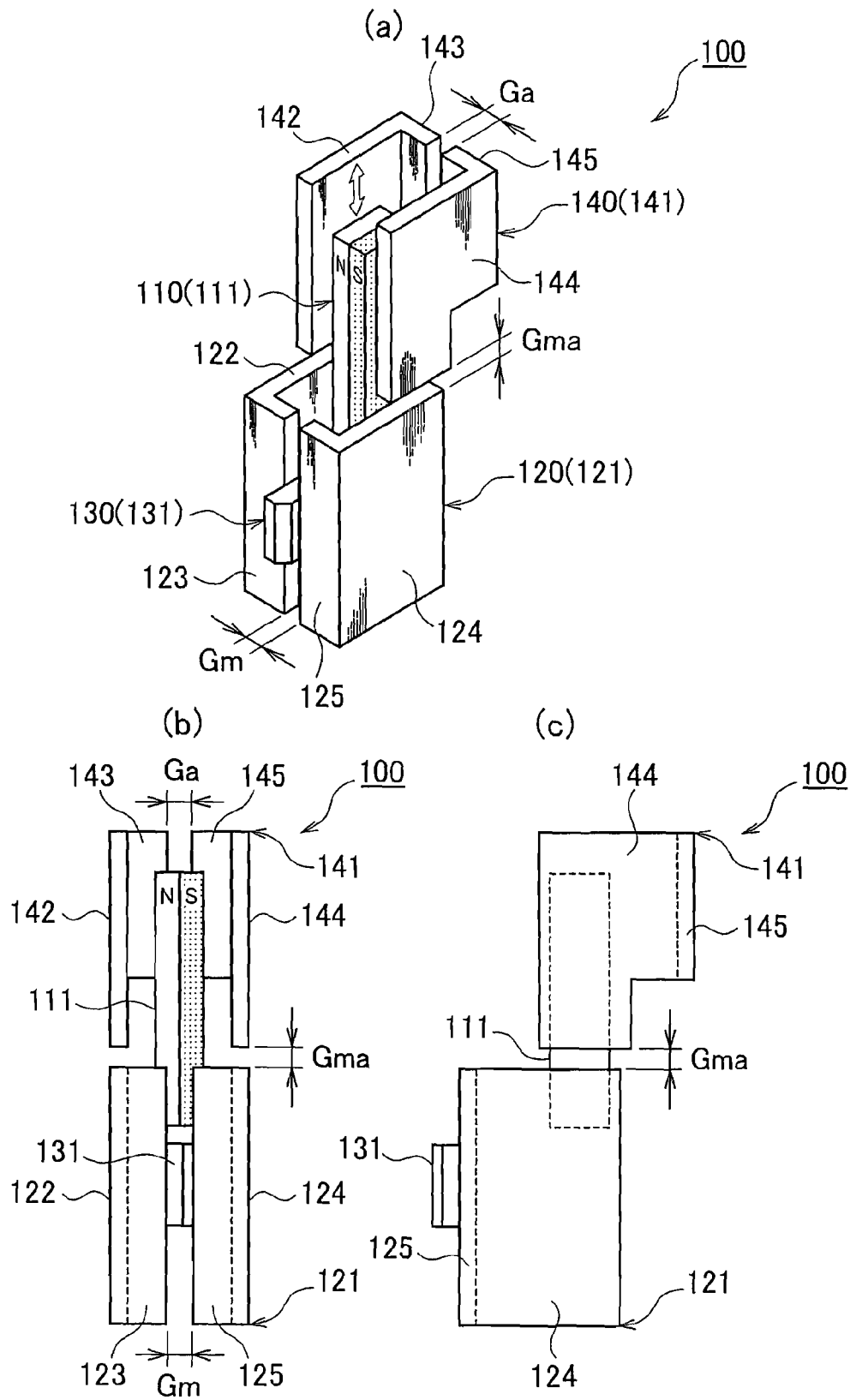

FIG. 1 includes views typically showing a non-contact position sensor in accordance with a first embodiment of the present invention, in which FIG. 1(a) is a perspective view of the sensor, FIG. 1(b) is a front view and FIG. 1(c) is a side view.

This non-contact position sensor 100 comprises a magnet 111 as a slider 110, a main stator 121 as a stator 120, a hall sensor 131 as a magnetically-sensitive sensor 130, and an assist stator 141 as a magnetic flux leakproof member 140.

The magnet 111 is in the form of a substantially flat plate having an N-pole on one side of both front and back faces of the magnet and an S-pole on the other side and is constructed so as to move in a longitudinal direction of the magnet (i.e. a vertical direction shown with arrow of FIG. 1(a)).

The main stator 121 consists of a magnetic body and includes a pair of opposed walls 122, 124 corresponding to both surfaces of the magnet 111. A transverse wall 123 extending from one edge of the opposed wall 122 toward the other opposed wall 124 and another transverse wall 125 extending from one edge of the other opposed wall 124 toward the opposed wall 122 are arranged close to each other through a gap Gm at a midpoint between the opposed walls 122, 124.

This gap Gm is formed uniformly between both ends of the main stator 121 (upper and lower ends in FIG. 1) along a moving direction of the magnet 111. The main stator 121 like this can be manufactured by pressing e.g. a plate material of magnetic material whose magnetic resistance is as small as possible.

The hall sensor 131 is arranged in an appropriate position in the gap Gm of the main stator 121. For example, it is desirable to arrange the sensor 131 at a midpoint between both ends of the main stator 121 (in FIG. 1, at a center level between the upper end and the lower end of the stator 121). In this way, on the ground that the gap Gm of the main stator 121 is provided to accommodate the hall sensor 131, it is preferable that the gap Gm is formed to be a clearance as small as it can accommodate the sensor 131.

The assist stator 141 consists of a magnetic body and includes a pair of opposed walls 142, 144 corresponding to both front and back faces of the magnet 111. A transverse wall 143 extending from one edge of the opposed wall 142 toward the other opposed wall 144 and another transverse wall 145 extending from one edge of the other opposed wall 144 toward the opposed wall 142 are arranged close to each other through a gap Ga at a midpoint between the opposed walls 142, 144.

This gap Ga is formed uniformly between both ends of the transverse walls 143, 145 (respective upper and lower ends in FIG. 1) along the moving direction of the magnet 111. In the assist stator 141, its lower portions spreading from the transverse walls 143, 145 up to the opposed walls 142, 144 are eliminated. Because these lower portions have less impact on characteristics of the sensor irrespective of their existence. The assist stator 141 like this can be manufactured by pressing e.g. a plate material of magnetic material whose magnetic resistance is as small as possible.

The main stator 121 and the assist stator 141 are arranged close to each other through a gap Gma along the moving direction of the magnet 111. In FIG. 1, since the assist stator 141 is positioned above the main stator 121, a spatial area defined between the opposed walls 142, 144 of the assist stator 141 is arranged above a spatial area defined between the opposed walls 122, 124 of the main stator 121, continuously.

The non-contact position sensor 100 constructed above can detect a position of the magnet 111 in a non-contact manner since the hall sensor 131 detects magnetic flux corresponding to an entrance percentage of the magnet 111 in entering the area between the opposed walls 122, 124 of the main stator 121, the magnet 111 being movable throughout the area between the opposed walls 122, 124 of the main stator 121 and the sequent area between opposed walls 142, 144 of the assist stator 141.

Again, this non-contact position sensor 100 is preventive of flux leakage since all flux generated from a part of the magnet 111 entering the area between the opposed walls 122, 124 of the main stator 121 passes trough a magnetic path formed by the main stator 121.

While, since all flux generated from a part of the magnet 111 entering the area between the opposed walls 142, 144 of the assist stator 141 passes trough a magnetic path formed by the assist stator 141, flux leakage is prevented as well.

Thus, assuming that the moving direction of the magnet 111 is represented by e.g. Z-direction, any offset of the magnet 111 in X-direction or Y-direction perpendicular to the Z-direction would not influence on the magnetic paths, thereby causing no change in detection outputs of the hall sensor 131.

Figure 2:
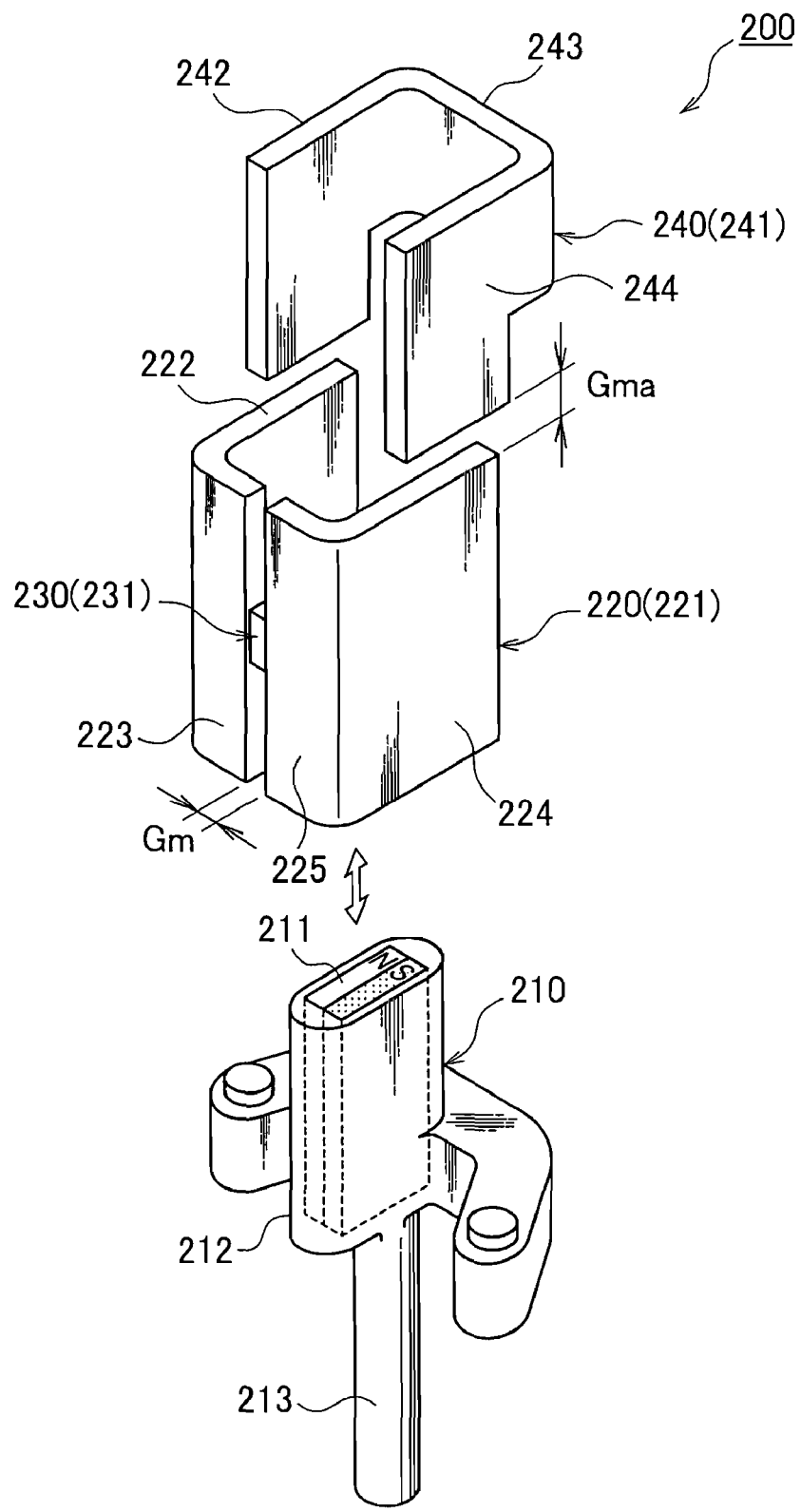
FIG. 2 is a perspective view typically showing the non-contact position sensor having its part developed, in accordance with a second embodiment of the present invention, whose part is developed.

FIG. 2 is a perspective view typically showing the non-contact position sensor having its part developed, in accordance with a second embodiment of the present invention. In this figure, elements similar to those of FIG. 1 are indicated with the same reference numerals plus one hundred respectively, and their overlapped descriptions are eliminated.

In this non-contact position sensor 200, a slider 210 comprises a slider body 212 accommodating a magnet 211 and a shaft 213 extending from the slider body 212 downwardly. Further, an assist stator 241 as a magnetic flux leakproof member 240 is formed by opposed walls 242, 244 whose side edges are connected with each other through a transverse wall 243 integrally. Therefore, the assist stator 241 is constructed as an integral part having no gap Ga of FIG. 1.

The non-contact position sensor 200 like this can detect a position of a magnet 211, namely, both positions of the slider body 212 and the shaft 213 in a non-contact manner since a hall sensor 231 detects magnetic flux corresponding to an entrance percentage of the magnet 211 in entering an area between opposed walls 222, 224 of a main stator 221, the magnet 211 of the slider 210 being movable throughout the area between the opposed walls 222, 224 of the main stator 221 and a sequent area between the opposed walls 242, 244 of the assist stator 241.

Again, this non-contact position sensor 200 is preventive of flux leakage since all flux generated from a part of the magnet 211 entering the area between the opposed walls 222, 224 of the main stator 221 passes trough a magnetic path formed by the main stator 221.

While, since all flux generated from a part of the magnet 211 entering the area between the opposed walls 242, 244 of the assist stator 241 passes trough a magnetic path formed by the assist stator 241, flux leakage is prevented as well.

Thus, assuming that the moving direction of the magnet 211 is represented by Z-direction, any offset of the magnet 211 in X-direction or Y-direction perpendicular to the Z-direction would not influence on the magnetic paths, thereby causing no change in detection outputs of the hall sensor 231.

Figure 3:
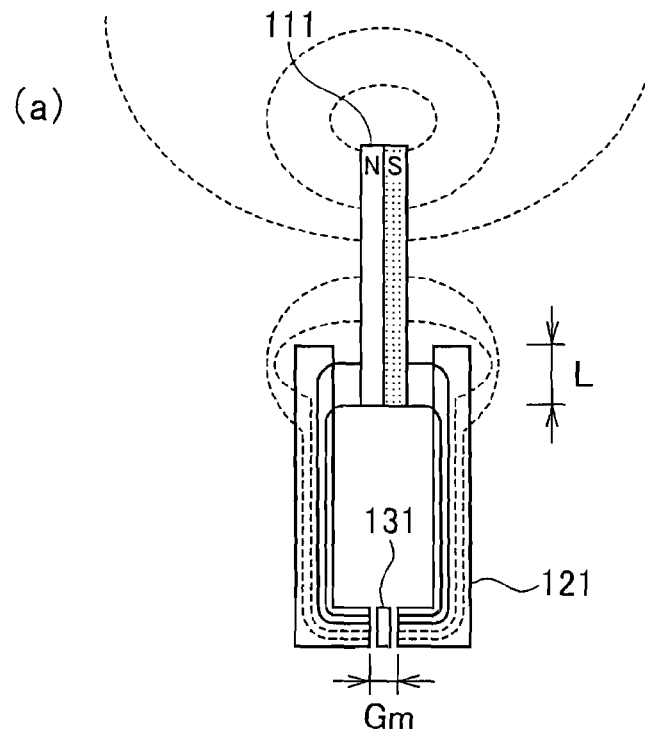
Figure 3:
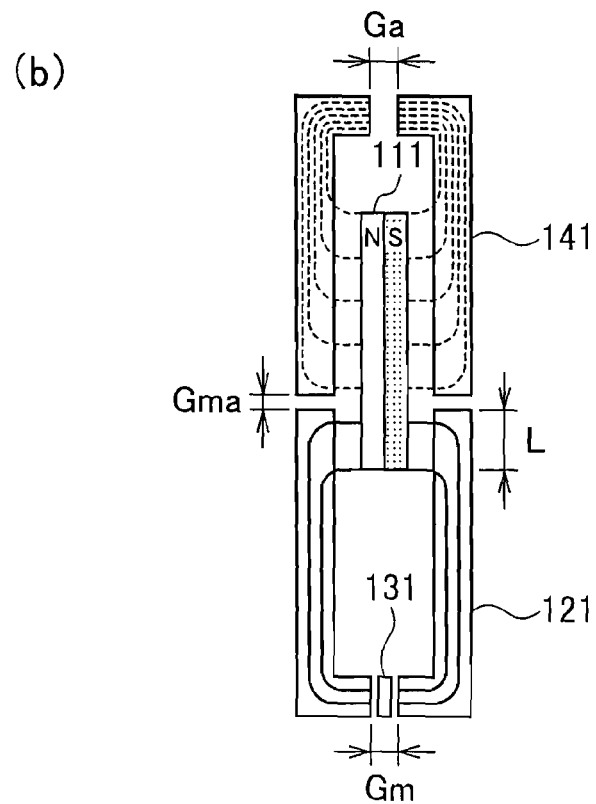

Taking the non-contact position sensor 100 shown in FIG. 1 as an example, FIG. 3 includes views typically showing that there exists a difference in situation of flux generated from the magnet 111 in between one case of having no assist stator 141 (FIG. 3($a$)) and another case of having the assist stator 141 (FIG. 3($b$)). Similarly, FIG. 4 includes views typically showing that there exists a difference in situation of the flux generated from the magnet 111 in between one case of the "integral-type" assist stator 141 having no gap Ga (FIG. 4($a$)) and another case of the "separation-type" assist stator 141 having the gap Ga (FIG. 3($b$)).

Figure 4:
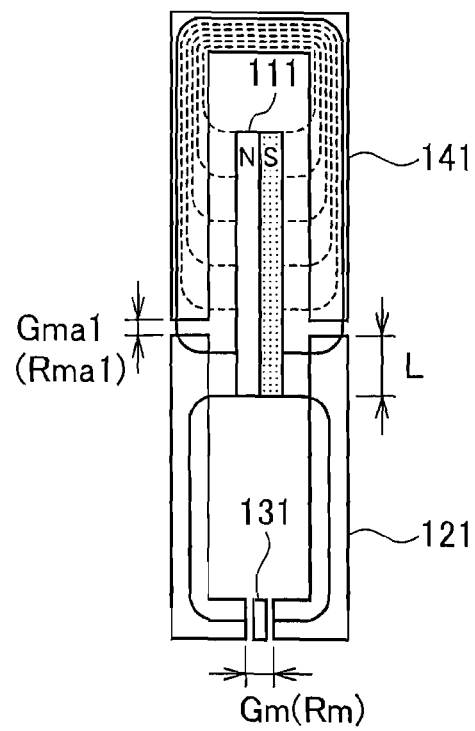
Figure 4:
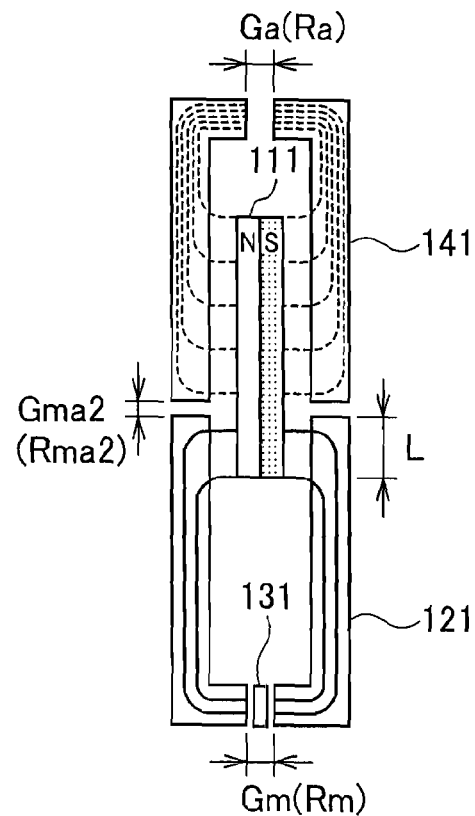

In each of FIGS. 3 and 4, for the sake of understanding, all of the moving direction of the magnet 111, the gap Gm of the main stator 121, the hall sensor 131, the gap Ga of the assist sensor 141 and the gap Gma between the main stator 121 and the assist stator 141 are illustrated on an identical plane. Then, the situations of flux shown with these typical views are substantially applicable to not only the non-contact position sensor 200 of FIG. 2 but all of later-mentioned non-contact position sensors 300, 400, 500, 600, 700, 800 and 900 similarly.

As shown in FIG. 3($a$), it is obvious that in case of no assist stator 141, part of flux close to the main stator 121, which is generated from a part of the magnet 111 that does not enter the main stator 121, enters the main stator 121. This part of flux entering the main stator 121 has an effect on linearity and hysteresis in the flux detection by the hall sensor 131.

Accordingly, it is noted that a change in flux detected by the hall sensor 131 is not proportional to an entrance length L of the magnet (part) 111 slotting into the main stator 121.

On the contrary, in case of the assist stator 141, the flux generated from the part of the magnet 111 that does not enter the main stator 121 enters the assist stator 141 and thus does not leak out into the main stator 121, as shown in FIG. 3($b$). Consequently, there is no possibility that the flux generated from the part of the magnet 111 that does not enter the main stator 121 has an effect on linearity and hysteresis in the detection of flux by the hall sensor 131.

Accordingly, a change in flux detected by the hall sensor 131 becomes proportional to the entrance length L of the magnet 111 entering the main stator 121, so that detecting accuracy of the non-contact position sensor 100 is improved. Consequently, there is need to arrange the assist stator 141, undoubtedly.

Here, it is assumed that a magnetic resistance of the gap Gm of the main stator 121 is represented by Rm and a magnetic flux of a gap Gma1 between the main stator 121 and the assist stator 141 is represented by Rma1. As shown in FIG. 4($a$), when the assist stator 141 is integrally formed with no gap Ga, a leakage of flux from the main stator 121 to the assist stator 141 is produced on condition of a relationship $Rma1 \leq Rm$.

Thus, in order to eliminate a leakage of flux between the main stator 121 and the assist stator 141, it is necessary to satisfy a condition of Rma1>Rm.

On the other hand, as shown in FIG. 4($b$), when the assist stator 141 is separately formed with a gap Ga whose magnetic resistance is represented by Ra, a leakage of flux from the assist stator 141 to the main stator 121 is produced on condition of a relationship Rm<Ra. Conversely, in case of a relationship Rm>Ra, a leakage of flux from the main stator 121 to the assist stator 141 is produced. Further, in case of relationships $Rma2 \leq Rm$, Ra, a leakage of flux is produced between the main stator 121 and the assist stator 141.

Thus, in order to eliminate a leakage of flux between the main stator 121 and the assist stator 141, it is necessary to satisfy a condition of Rma2>Rm=Ra.

Meanwhile, since it can be presumed that the leakage of flux from the main stator 121 to the assist stator 141 becomes smaller on condition of Ra>0 rather than Ra=0, there is established a relationship of Rma1>Rma2. Further, since it can be presumed that to get Rma larger has an effect (surge) on linearity, it is necessary to reduce Rma as possible. As a result, it is obvious that a provision of the assist stator 141 with the gap Ga is desirable.

Nevertheless, even if providing no gap Ga, it is effective to provide the sensor with the assist stator 141, as mentioned above. Therefore, the present invention includes even a sensor having an assist stator (e.g. the assist stator 141) provided with no gap Ga.

Figure 5:
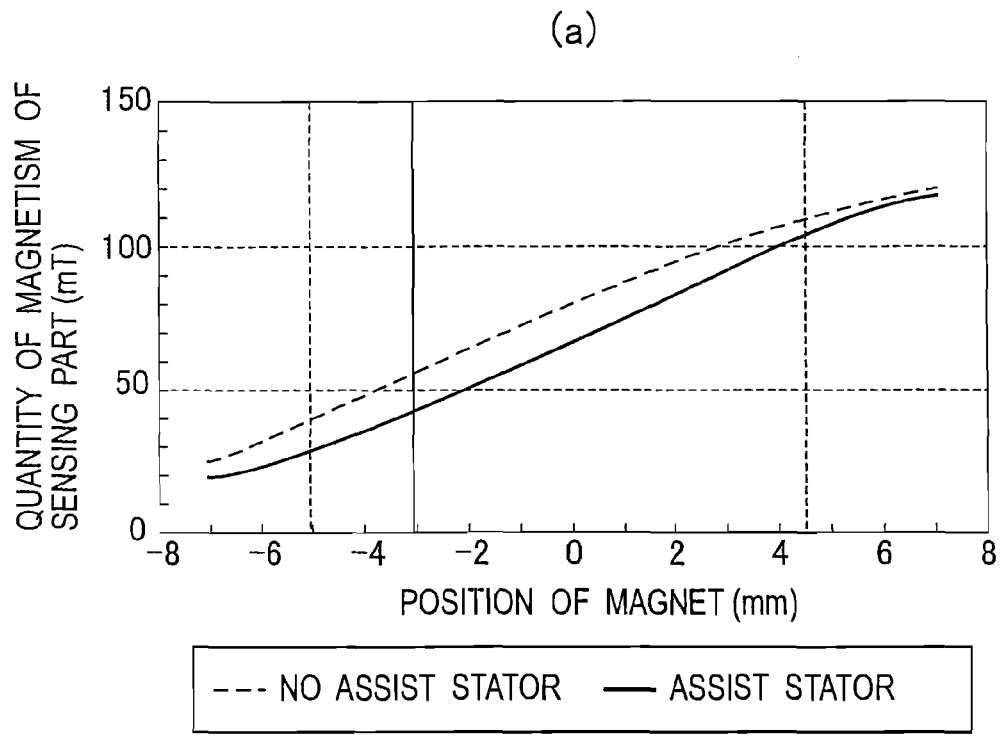
Figure 5:
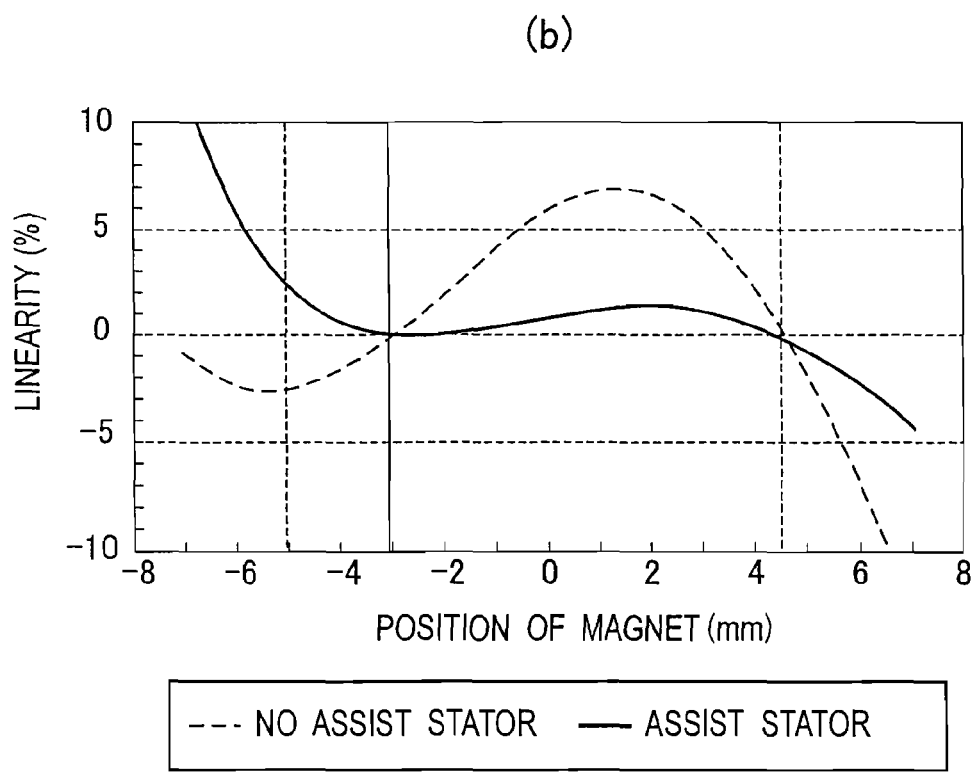

FIG. 5 includes graphs concerning a quantity of magnetism of a sensing part (FIG. 5(a)) and a linearity (FIG. 5(b)) corresponding to the presence of the assist stators 141, 241. From these graphs, it will be understood that the quantity of magnetism of the sensing part gets smaller and the linearity becomes flatter in each of cases (shown with solid lines) of having the assist stators 141, 241 due to no influence from the leakage of flux, in comparison with other cases (shown with broken lines) without the assist stators 141, 241.

According to the above-mentioned non-contact position sensors 100, 200;

(1) with the use of the assist stators 141, 241, it is possible to prevent flux from leaking out to the outside;

(2) with the use of the assist stators 141, 241, it is possible to detect the positions of the magnets 111, 211 within their entire operation ranges appropriately;

(3) it is possible to provide non-contact position sensors that are compact in respective moving directions of the magnets 111, 211 in relation to their moving spans;

(4) with the detection of flux at a center between both ends of the gap Gm formed uniformly throughout both ends of the main stator 121 (221), it is possible to attain sensor characteristics exhibiting improved linearity and reduced hysteresis;

(5) by adjusting a balance between the gap Gm of the main stator 121 (221) and the gap Gma formed between the main stator 121 (221) and the assist stator 141 (241), it is possible to correct and alter output characteristics of the sensor;

(6) by determining the presence of the gap Ga of the assist stator 141 (241) and adjusting a clearance of the gap Ga, it is possible to correct and alter output characteristics of the sensor; and (7) since both of the main stator 121 (221) and the assist stator 141 (241) are manufactured by press operations, it is possible to produce the sensor in a low price.

Figure 6:
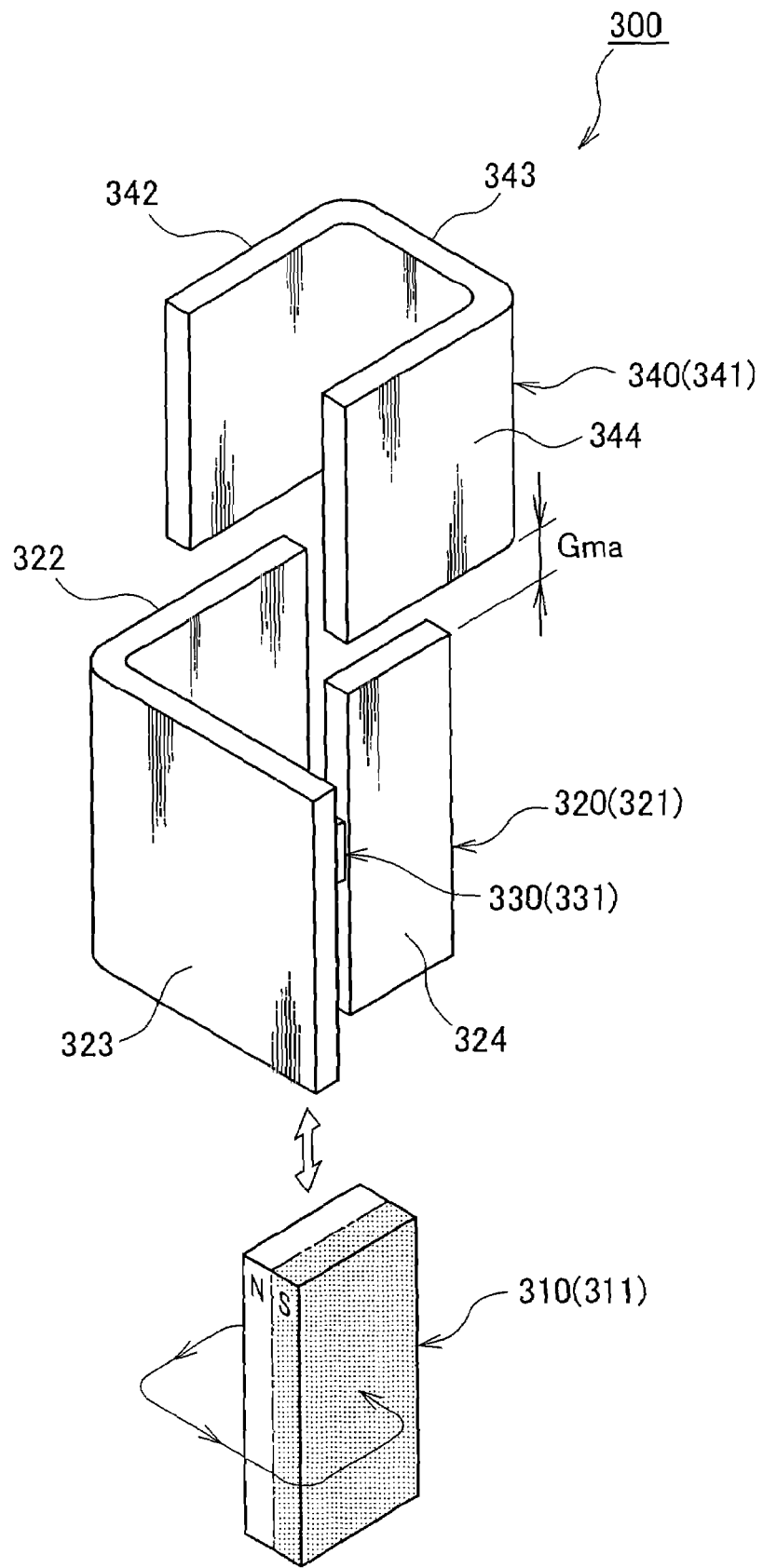
FIG. 6 is a perspective view typically showing the non-contact position sensor having its part developed, in accordance with a third embodiment of the present invention.
Figure 7:
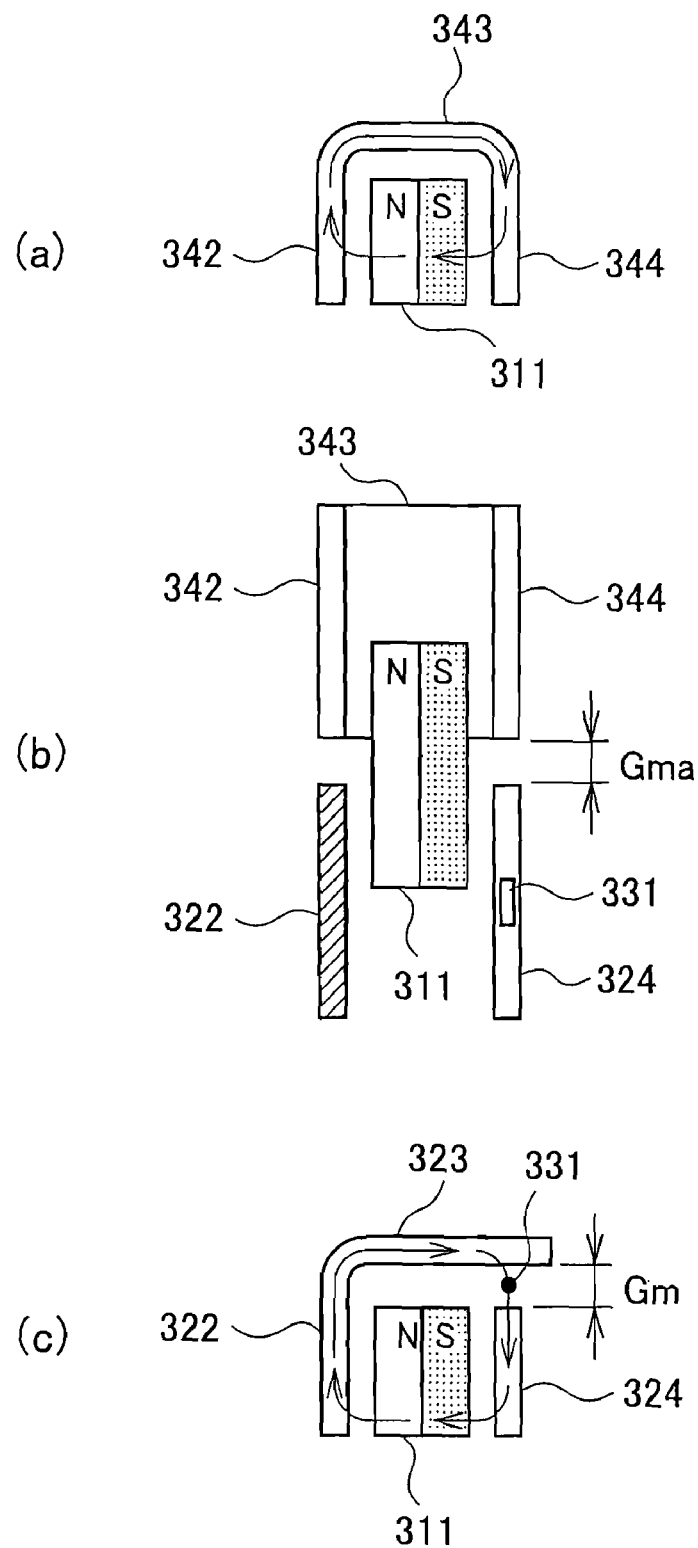
FIG. 7(a) is a top view of the non-contact position sensor of FIG. 6.
FIG. 7(b) is a longitudinal sectional and front view of FIG. 6
FIG. 7(c) is a bottom view of FIG. 6.

FIG. 6 is a perspective view typically showing the non-contact position sensor having its part developed, in accordance with a third embodiment of the present invention. FIG. 7 shows a top view (FIG. 7(a)), a longitudinal sectional and front view (FIG. 7(b)) and a bottom view (FIG. 7(c)) of the sensor. In these figures, elements similar to those of FIG. 1 are indicated with the same reference numerals plus two hundreds respectively, and their overlapped descriptions are eliminated.

In a main stator 321 of this non-contact position sensor 300, a transverse wall 323 continuing to one opposed wall 322 is formed to extend over the other opposed wall 324 and further, the transverse wall 323 and one edge of the opposed wall 324 are adjacent to each other through a gap Gm. This gap Gm is formed uniformly throughout both ends (upper and lower ends in FIGS. 6 and 7) of the main stator 321 along a moving direction of the magnet 311.

A hall sensor 331 is arranged in an appropriate position in the gap Gm of the main stator 321. For example, it is desirable to arrange the sensor 331 at a midpoint between both ends of the main stator 321 (in FIGS. 6 and 7, at a center level between the upper end and the lower end of the stator 321). In this way, on the ground that the gap Gm of the main stator 321 is provided to accommodate the hall sensor 331, it is preferable that the gap Gm is formed to have a clearance as small as it can accommodate the sensor 331 although the gap Gm appears to be remarkably broad in the figure.

An assist stator 341 as a magnetic flux leakproof member 340 is formed by opposed walls 342, 344 whose side edges are connected with each other through a transverse wall 343 integrally and therefore, the assist stator 341 is constructed as an integral part having no gap Ga. Additionally, the assist stator 341 is formed so that a lower part of the transverse wall 343 is level with those of the opposed walls 342, 344 without removing the lower part of the transverse wall 343.

The non-contact position sensor 300 like this can detect a position of the magnet 311 in a non-contact manner since a hall sensor 331 detects magnetic flux corresponding to an entrance percentage of the magnet 311 in entering an area between the opposed walls 322, 324 of the main stator 321, the magnet 311 being movable throughout the area between the opposed walls 322, 324 of the main stator 321 and a sequent area between the opposed walls 342, 344 of the assist stator 341.

Again, this non-contact position sensor 300 is preventive of flux leakage since all flux generated from a part of the magnet 311 entering the area between the opposed walls 322, 324 of the main stator 321 passes trough a magnetic path formed by the main stator 321.

While, since all flux generated from a part of the magnet 311 entering the area between the opposed walls 342, 344 of the assist stator 341 passes trough a magnetic path formed by the assist stator 341, flux leakage is prevented as well.

Thus, assuming that the moving direction of the magnet 311 is represented by Z-direction, any offset of the magnet 311 in X-direction or Y-direction perpendicular to the Z-direction would not influence on the magnetic paths, thereby causing no change in outputs of the hall sensor 331.

Figure 8:
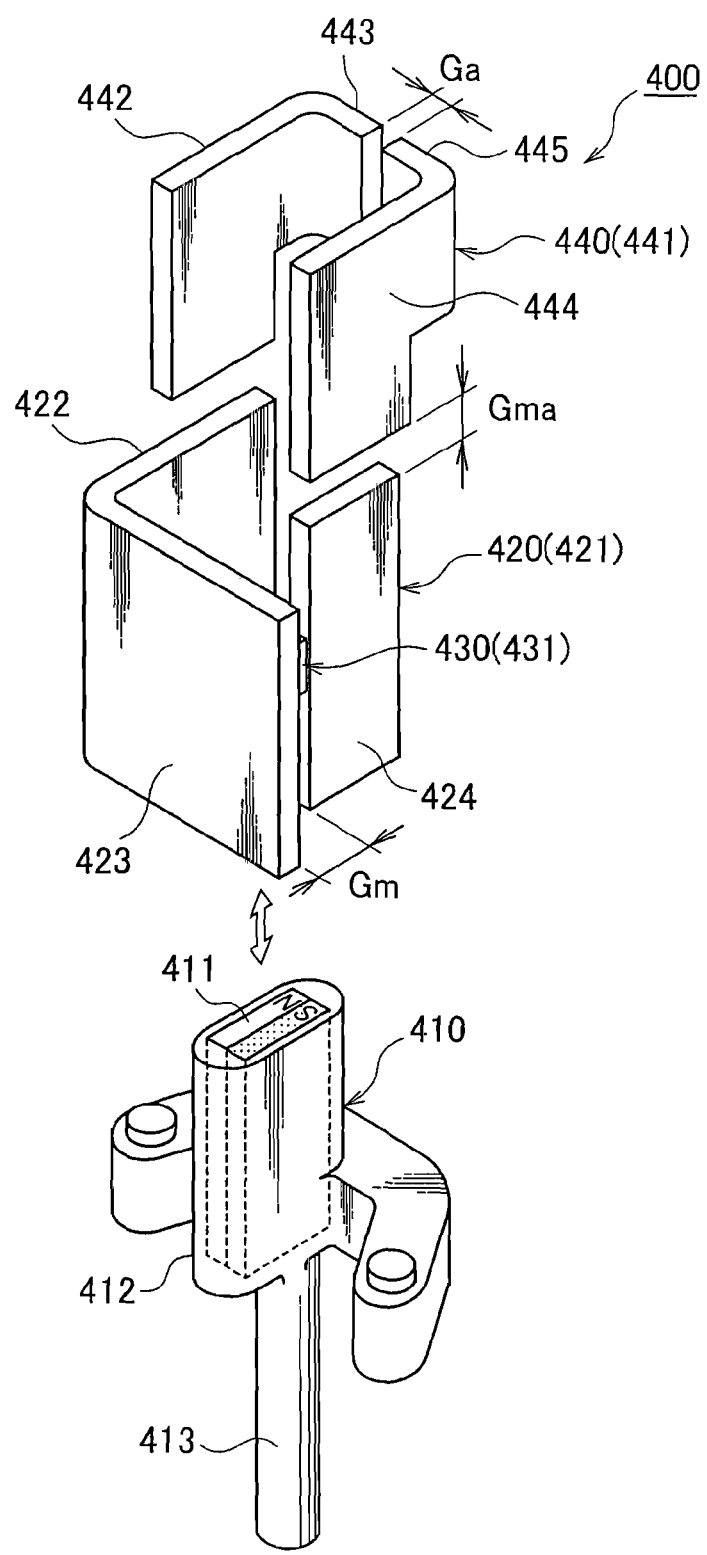
FIG. 8 is a perspective view typically showing the non-contact position sensor having its part developed, in accordance with a fourth embodiment of the present invention.

FIG. 8 is a perspective view typically showing the non-contact position sensor having its part developed, in accordance with a fourth embodiment of the present invention. In the figure, elements similar to those of FIG. 6 are indicated with the same reference numerals plus one hundred respectively, and their overlapped descriptions are eliminated.

In this non-contact position sensor 400, a slider 410 comprises a slider body 412 accommodating a magnet 411 and a shaft 413 extending from the slider body 412 downwardly. Further, in an assist stator 441 as a magnetic flux leakproof member 440, a transverse wall 443 extending from one edge of one opposed wall 442 toward the other opposed wall 444 and another transverse wall 445 extending from one edge of the other opposed wall 444 toward the opposed wall 442 are arranged close to each other through a gap Ga at a midpoint between the opposed walls 442, 444. Additionally, in the assist stator 441, its lower parts extending from the transverse walls 443, 445 to the opposed walls 442, 444 are eliminated.

Again, on the ground that the gap Gm of the main stator 421 is provided to accommodate a hall sensor 431, it is preferable that the gap Gm is formed to have a clearance as small as it can accommodate the sensor 431 although the gap Gm appears to be remarkably broad in the figure.

The non-contact position sensor 400 like this can detect a position of the magnet 411, namely, both positions of the slider body 412 and the shaft 413 in a non-contact manner since the hall sensor 431 detects magnetic flux corresponding to an entrance percentage of the magnet 411 in entering an area between the opposed walls 422, 424 of the main stator 421, the magnet 411 being movable throughout the area between the opposed walls 422, 424 of the main stator 421 and a sequent area between the opposed walls 442, 444 of the assist stator 441.

Again, this non-contact position sensor 400 is preventive of flux leakage since all flux generated from a part of the magnet 411 entering the area between the opposed walls 422, 424 of the main stator 421 passes trough a magnetic path formed by the main stator 421.

While, since all flux generated from a part of the magnet 411 entering the area between the opposed walls 442, 444 of the assist stator 441 passes trough a magnetic path formed by the assist stator 341, flux leakage is prevented as well.

Thus, assuming that the moving direction of the magnet 411 is represented by Z-direction, any offset of the magnet 411 in X-direction or Y-direction perpendicular to the Z-direction would not influence on the magnetic paths, thereby causing no change in detection outputs of the hall sensor 431.

Figure 9:
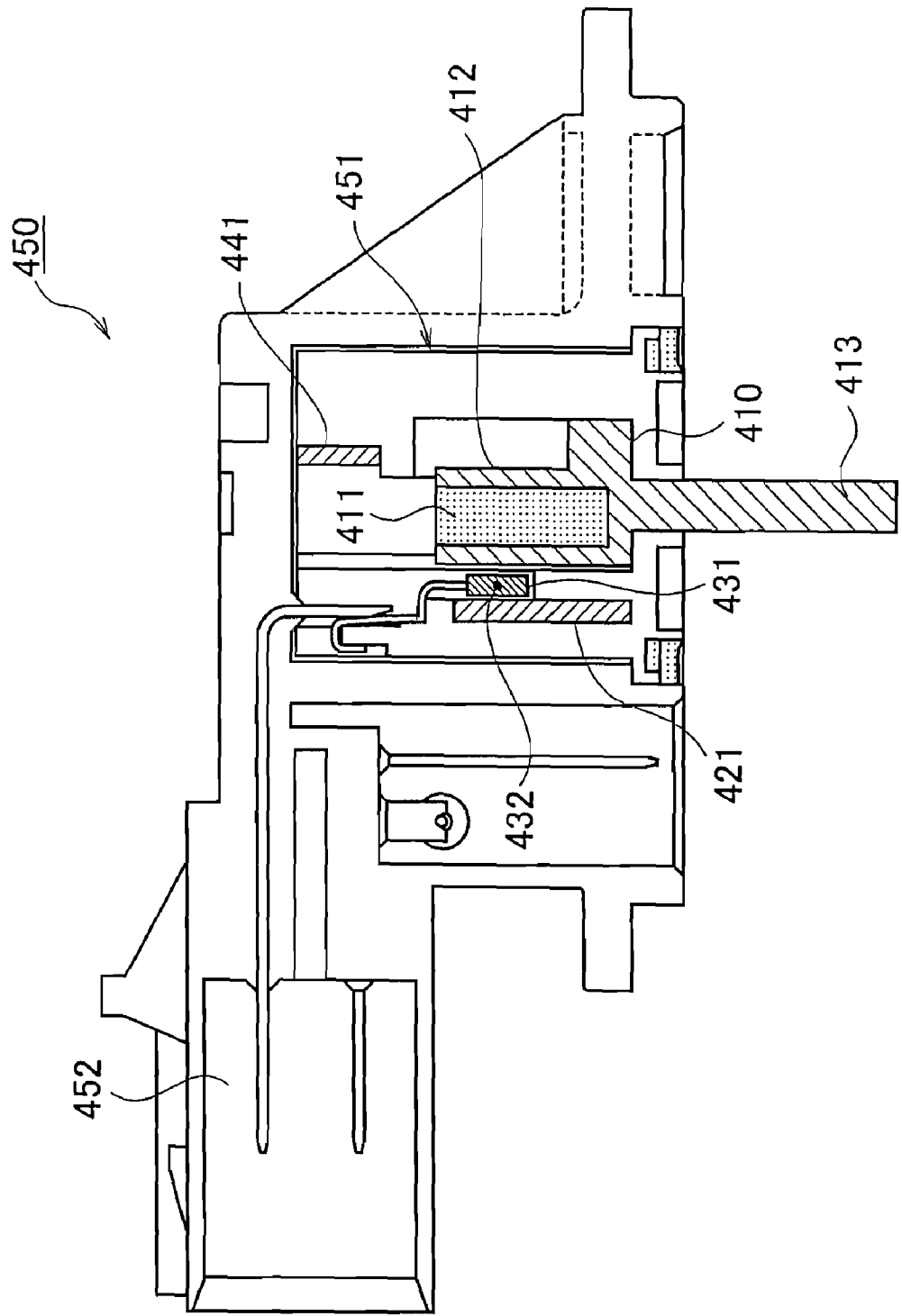
FIG. 9 is a sectional view showing one example of applying the non-contact position sensor of FIG. 8 to a position sensor for EGR valve.

FIG. 9 is a sectional view showing one example where the non-contact position sensor 400 of FIG. 8 is applied to a position sensor for EGR valve. This position sensor 450 for EGR valve includes the main stator 421 and the assist stator 441 held by a stator holder 451 provided in a sensor body. In the sensor 450, since the slider 410 accommodating the magnet 411 moves up and down in the figure, the hall sensor 431 detects, at its detecting position 432, a position of the magnet 411, that is, both positions of the slider body 412 and the shaft 413. In the figure, reference numeral 452 designates a connector terminal for connecting a terminal of the hall sensor 431.

Figure 10:
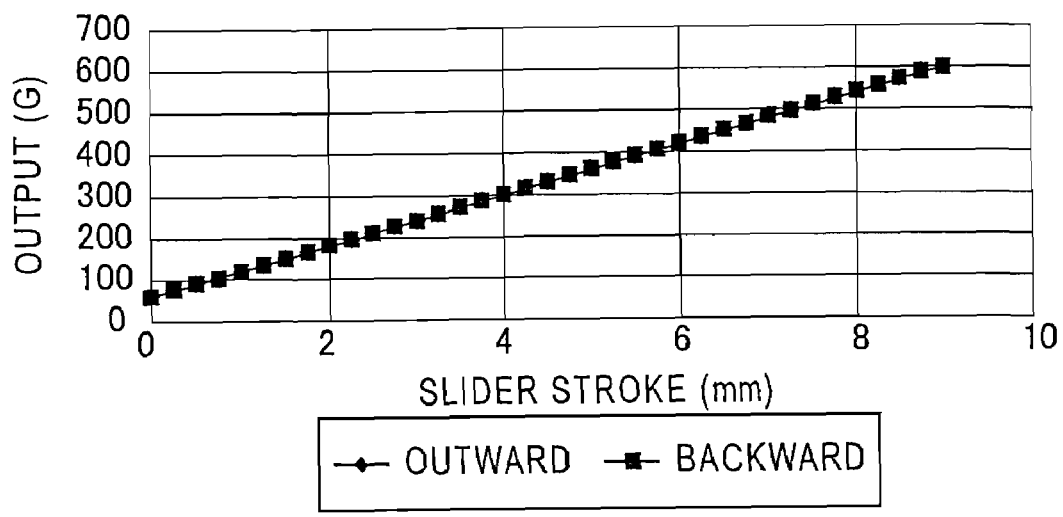
Figure 10:
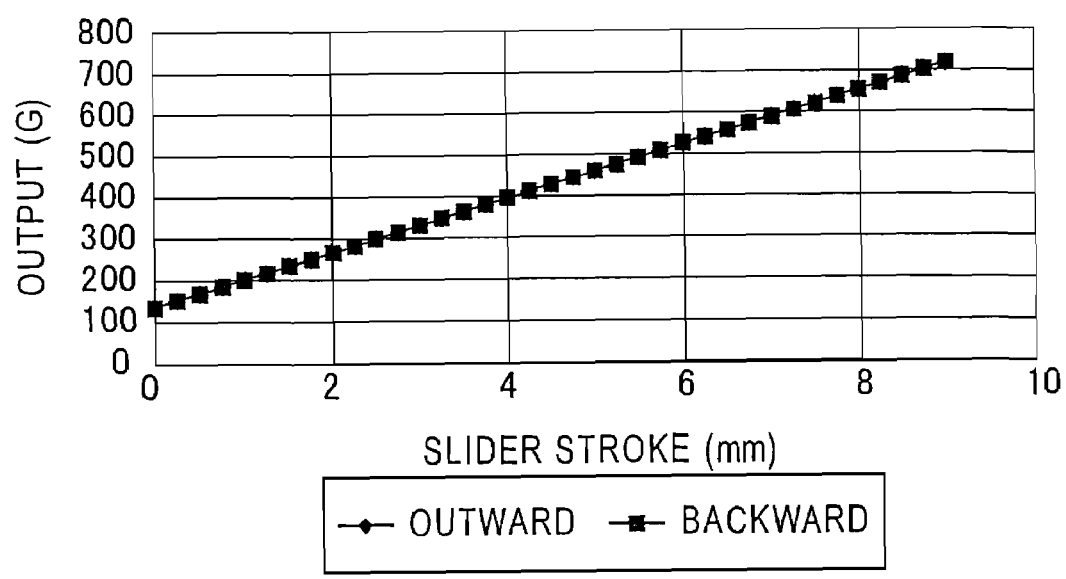

FIG. 10 includes graphs showing a comparison of output characteristics (FIG. 10(a)) of the non-contact position sensor 300 using the integral-type assist stator 341 having no gap Ga with output characteristics (FIG. 10(b)) of the non-contact position sensor 400 using the separation-type assist stator 441 having the gap Ga.

It is found that when employing the separation-type assist stator 441 shown in FIG. 10(b), an output of the non-contact position sensor 400 keeps to be larger than an output of the sensor in case of employing the integral-type assist stator 341 shown in FIG. 10(a) and furthermore, a difference between the outputs gradually increases as the operation of the slider stroke proceeds. This is because an influence of magnetic force of the assist stator 441 on the main stator 421 increases due to separation of an assist stator.

Figure 11:
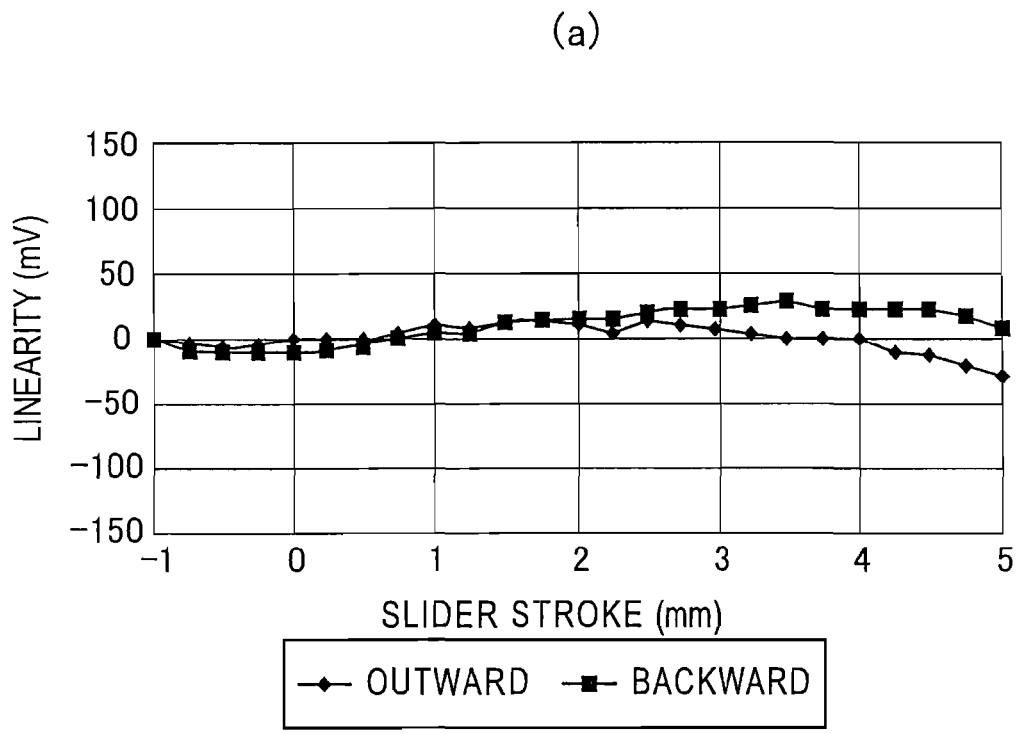
Figure 11:
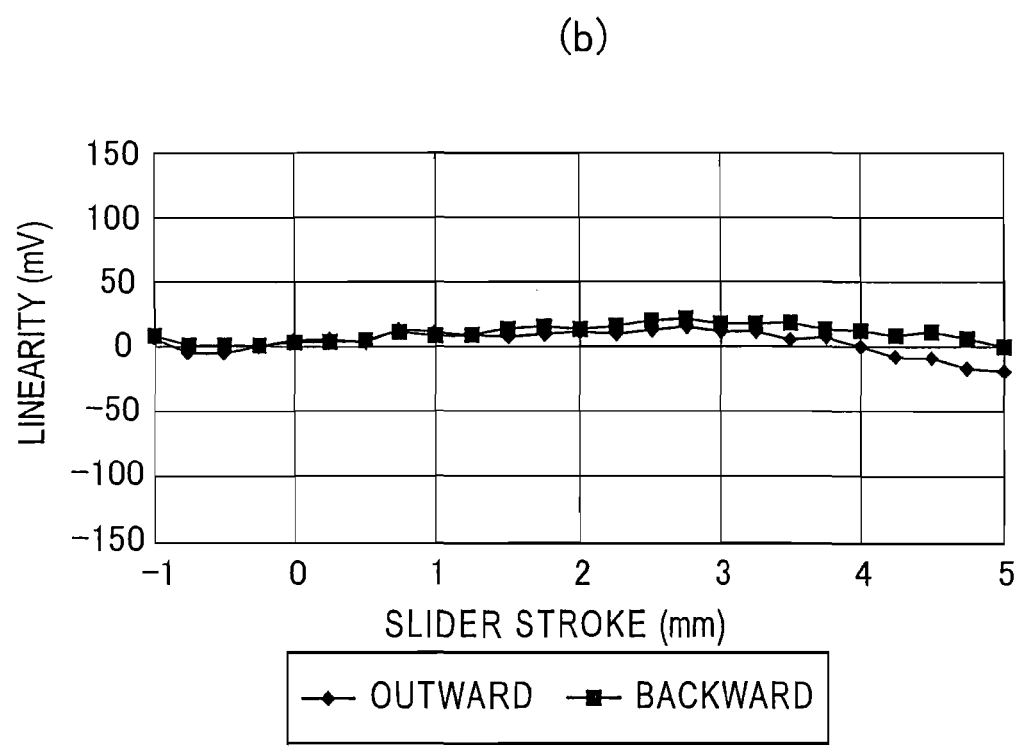

Provided that the detecting position is established in a position deviated from each center of the main stators 321, 421 toward each of the assist stators 341, 441 by an appropriate distance (e.g. 2 mm), FIG. 11 includes graphs showing a comparison of hysteresis characteristics (FIG. 11(a)) of the non-contact position sensor 300 using the integral-type assist stator 341 having no gap Ga with hysteresis characteristics (FIG. 11(b)) of the non-contact position sensor 400 using the separation-type assist stator 441 having the gap Ga.

From the figure, it is found that the sensor employing the separation-type assist stator 441 shown in FIG. 11(b) exhibits smaller hysteresis and better linearity than those of the sensor employing the integral-type assist stator 341 shown in FIG. 11(a).

Figure 12:
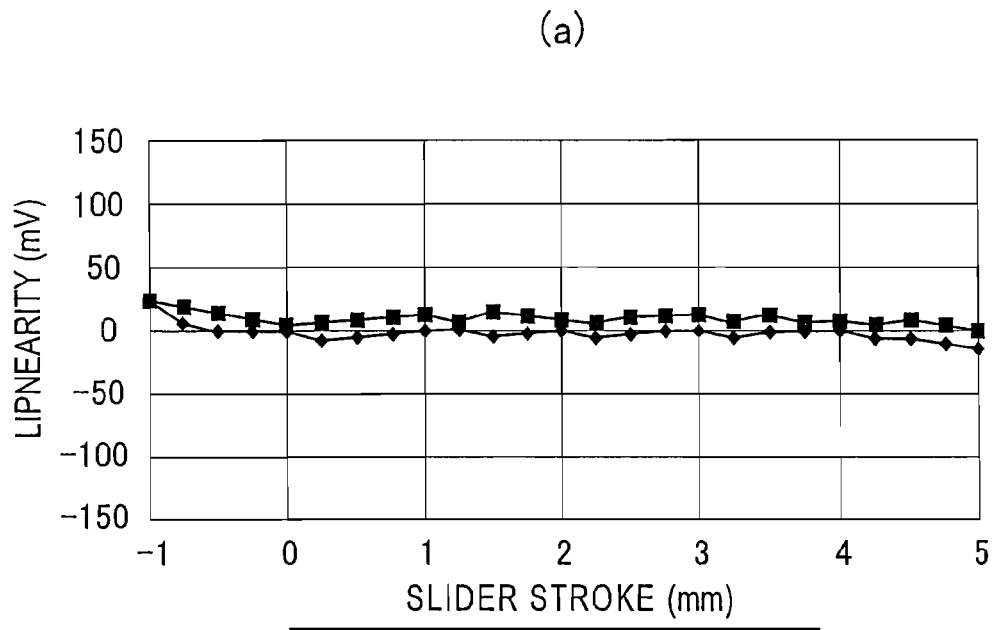
Figure 12:
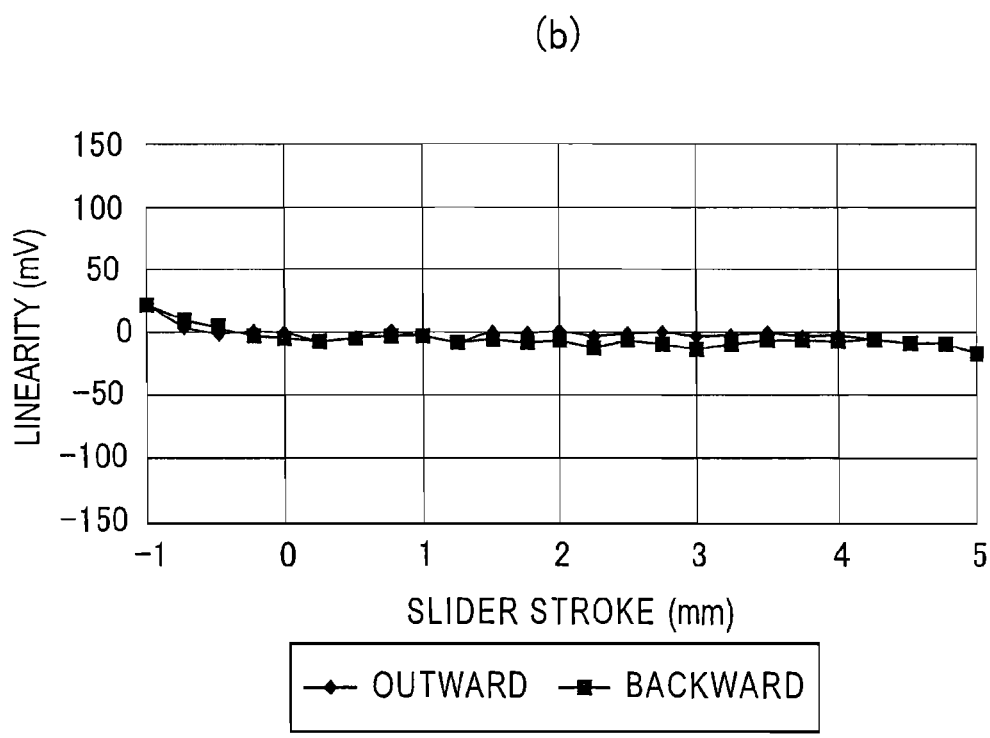

Provided that the detecting positions are established at respective centers of the main stators 321, 421, FIG. 12 includes graphs showing a comparison of the hysteresis characteristics (FIG. 12(a)) of the non-contact position sensor 300 using the integral-type assist stator 341 having no gap Ga with the hysteresis characteristics (FIG. 12(b)) of the non-contact position sensor 400 using the separation-type assist stator 441 having the gap Ga.

Also in this case, it is found that the sensor employing the separation-type assist stator 441 shown in FIG. 12(b) exhibits smaller hysteresis and better linearity than those of the sensor employing the integral-type assist stator 341 shown in FIG. 12(a).

In this way, despite of whether the detecting positions are at the centers of the main stators 321, 421 respectively or deviated from the same centers, the sensor employing the separation-type assist stator 441 exhibits smaller hysteresis and better linearity than those of the sensor employing the integral-type assist stator 341. Therefore, it is found that desirable hysteresis characteristics can be established by adjusting a separation clearance of the assist stator 441.

Additionally comparing FIG. 11(a) with FIG. 12(a) about the sensors each employing the integral-type assist stator 341 in common, it is found that one sensor where the detecting position is established at the center of the main stator 321 exhibits smaller hysteresis and better linearity than the other sensor where the detecting position is deviated from the center of the main stator 321.

Comparing FIG. 11(b) with FIG. 12(b) about the sensors each employing the separation-type assist stator 441 in common, it is found that one sensor where the detecting position is established at the center of the main stator 421 exhibits smaller hysteresis and better linearity than the other sensor where the detecting position is deviated from the center of the main stator 421.

In this way, despite of whether the assist stators 341, 441 are type of integral or separation, it is found that it is important to set the detecting positions of the sensors at the centers of the main stators 321, 421 respectively in order to reduce hysteresis and improve linearity of the sensors.

According to the above-mentioned non-contact position sensors 300, 400;

(1) with the use of the assist stators 341, 441, it is possible to prevent flux from leaking out to the outside;

(2) with the use of the assist stators 341, 441, it is possible to detect the positions of the magnets 311, 411 within their whole operation ranges appropriately;

(3) it is possible to provide sensors that are compact in respective moving directions of the magnets 311, 411 in relation to their moving spans;

(4) with the detection of flux at a center between both ends of the gap Gm formed uniformly throughout both ends of the main stator 321 (421), it is possible to attain sensor characteristics exhibiting improved linearity and reduced hysteresis;

(5) by adjusting a balance between the gap Gm of the main stator 321 (421) and the gap Gma formed between the main stator 321 (421) and the assist stator 341 (441), it is possible to correct and alter output characteristics of the sensor;

(6) by determining the presence of the gap Ga of the assist stator 341 (441) and adjusting a clearance of the gap Ga, it is possible to correct and alter output characteristics of the sensor; and (7) since both of the main stator 321 (421) and the assist stator 341 (441) are manufactured by press operations, it is possible to produce the sensor in a low price.

Figure 13:
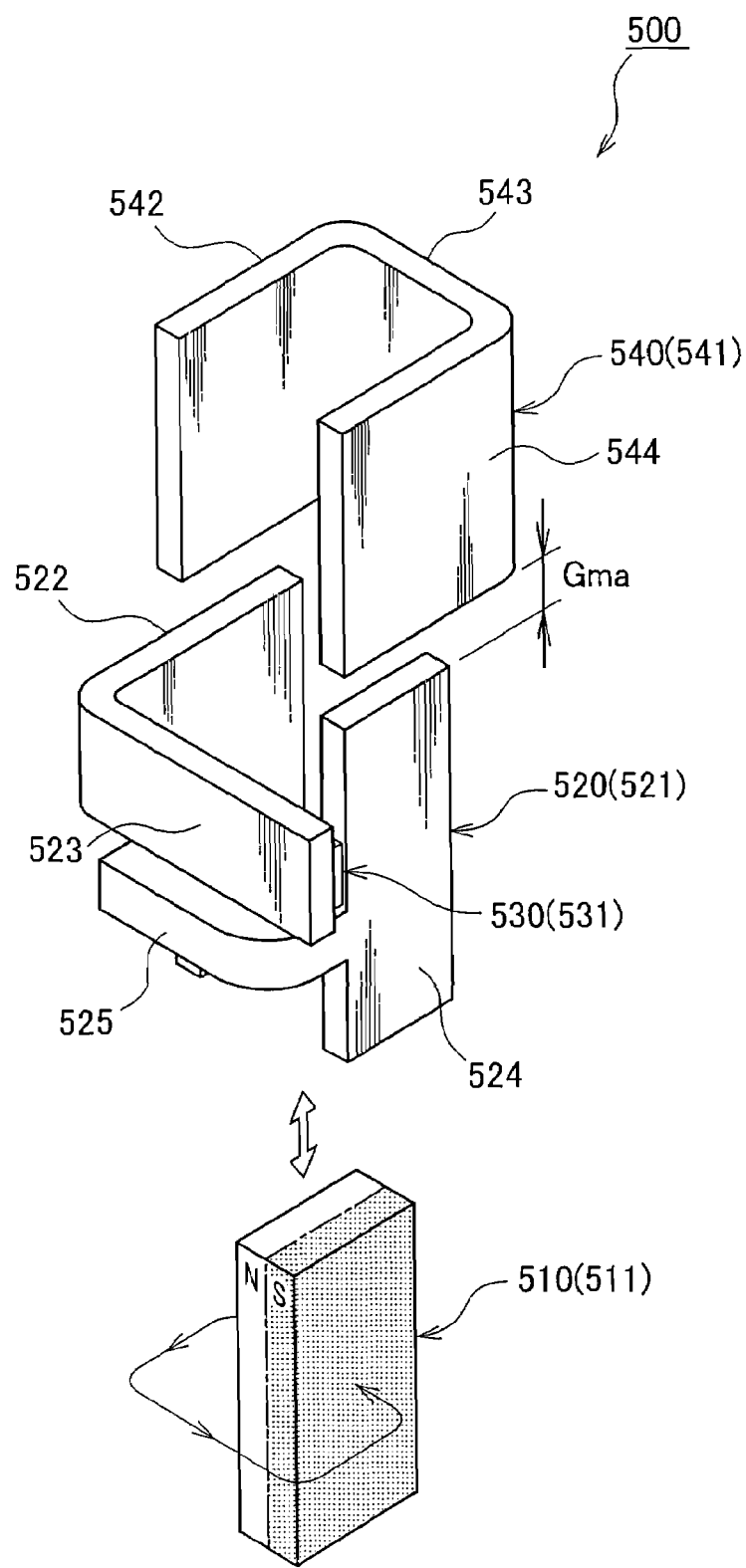
FIG. 13 is a perspective view typically showing the non-contact position sensor having its part developed, in accordance with a fifth embodiment of the present invention.

FIG. 13 is a perspective view typically showing the non-contact position sensor having its part developed, in accordance with a fifth embodiment of the present invention. FIG.

Figure 14:
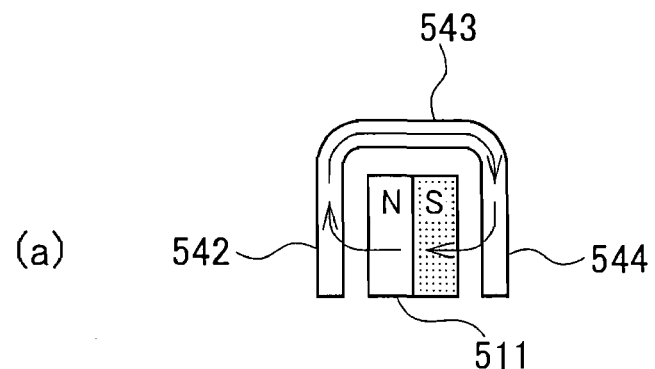
FIG. 14(a) is a top view of the non-contact position sensor of FIG. 13.
FIG. 14(b) is a longitudinal sectional and front view of the non-contact position sensor of FIG. 13
Figure 14:
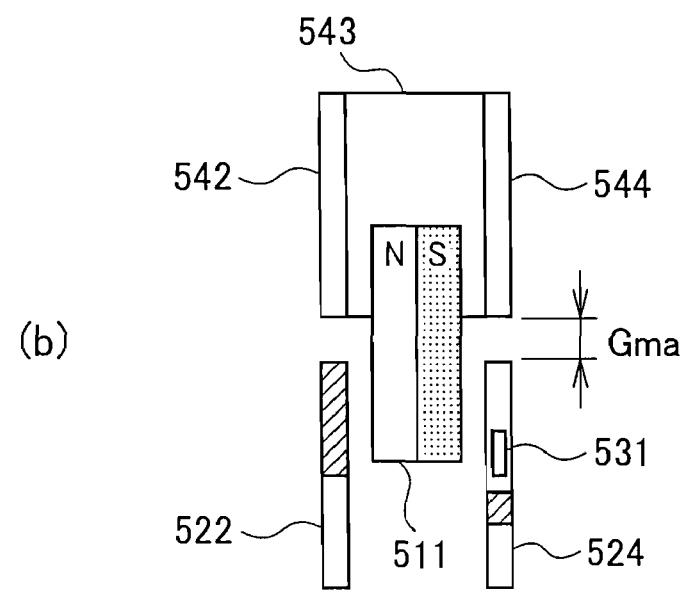
Figure 14:
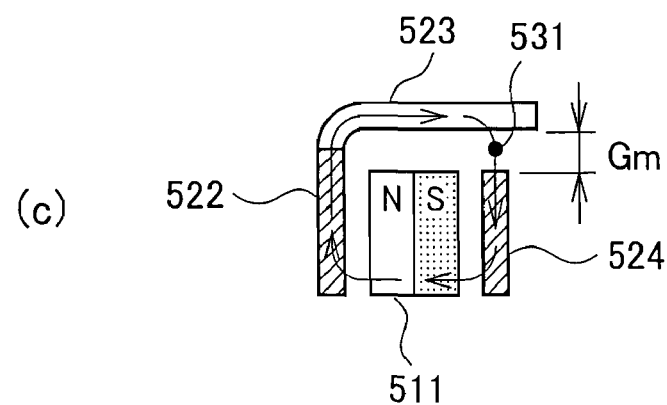

14 shows a top view (FIG. 14(a)), a longitudinal sectional/front view (FIG. 14(b)) and a bottom view (FIG. 14)) of the sensor. In these figures, elements similar to those of FIG. 1 are indicated with the same reference numerals plus four hundreds respectively, and their overlapped descriptions are eliminated.

In a main stator 521 of this non-contact position sensor 500, a transverse wall (main arm) 523 continuing to a substantial upper half part of one opposed wall 522 is formed to extend over the other opposed wall 524 and further, the transverse wall 523 and one edge of the opposed wall 524 are adjacent to each other through a gap Gm.

This gap Gm is formed uniformly throughout upper and lower ends of the transverse wall (main arm) 523. In the main stator 521, a transverse wall (auxiliary arm) 525 continuing to a middle but slightly lower part of the other opposed wall 524 is formed to extend up to the opposed wall 522 and further, the transverse wall (auxiliary arm) 525 and one edge of the opposed wall 522 are adjacent to each other through a not-shown gap. This gap is also formed uniformly throughout upper and lower ends of the transverse wall (auxiliary arm) 525.

A hall sensor 531 is arranged in an appropriate position in a gap of the main stator 521, namely, the gap Gm of the main arm 523. For example, in view of arranging the sensor in a position close to a midpoint between both ends of the main stator 521, it is desirable to arrange the sensor 531 in the vicinity of the lower end of the main arm 523 in FIGS. 13 and 14. In this way, on the ground that the gap of the main stator 521, that is, the gap Gm of the main arm 523 is provided to accommodate the hall sensor 531, it is preferable that the gap Gm is formed to have a clearance as small as it can accommodate the sensor 531 although the gap Gm appears to be remarkably broad in the figure.

An assist stator 541 as a magnetic flux leakproof member 540 is formed by opposed walls 542, 544 whose side edges are connected with each other through a transverse wall 543 integrally and therefore, the assist stator 541 is constructed as an integral part having no gap Ga. Additionally, the assist stator 541 is formed so that a lower part of the transverse wall 543 is level with those of the opposed walls 542, 544 without removing the lower part of the transverse wall 543.

The non-contact position sensor 500 like this can detect a position of a magnet 511 in a non-contact manner since the hall sensor 531 detects magnetic flux corresponding to an entrance percentage of the magnet 511 in entering an area between the opposed walls 522, 524 of the main stator 521, the magnet 511 being movable throughout the area between the opposed walls 522, 524 of the main stator 521 and a sequent area between the opposed walls 542, 544 of the assist stator 541.

Again, this non-contact position sensor 500 is preventive of flux leakage since all flux generated from a part of the magnet 511 entering the area between the opposed walls 522, 524 of the main stator 521 passes through a magnetic path formed by the main stator 521.

While, since all flux generated from a part of the magnet 511 entering the area between the opposed walls 542, 544 of the assist stator 541 passes through a magnetic path formed by the assist stator 541, flux leakage is prevented as well.

Thus, assuming that the moving direction of the magnet 511 is represented by Z-direction, any offset of the magnet 511 in X-direction or Y-direction perpendicular to the Z-direction would not influence on the magnetic paths, thereby causing no change in detection outputs of the hall sensor 531.

Figure 15:
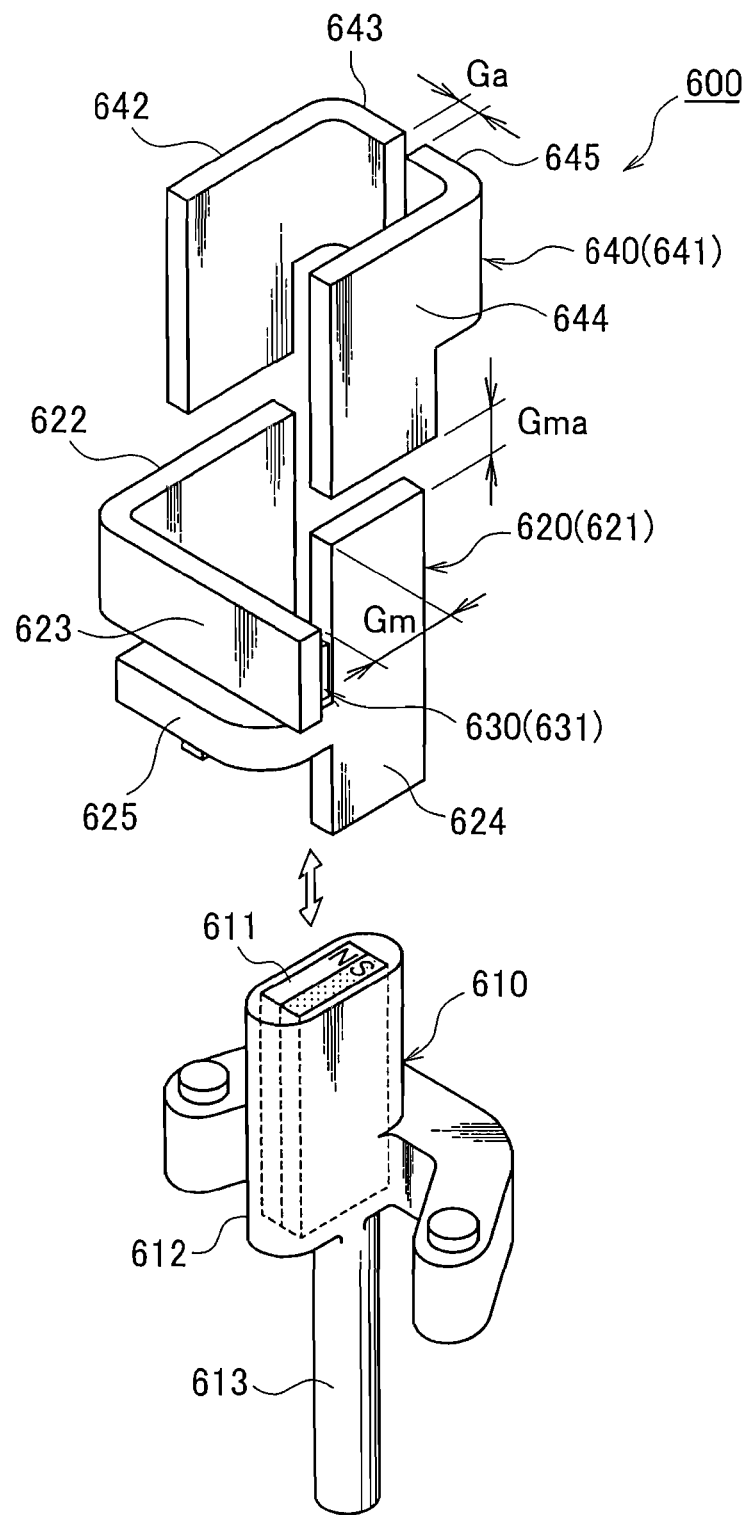
FIG. 15 is a perspective view typically showing the non-contact position sensor having its part developed, in accordance with a sixth embodiment of the present invention.

FIG. 15 is a perspective view typically showing the non-contact position sensor having its part developed, in accordance with a sixth embodiment of the present invention. In the figure, elements similar to those of FIG. 13 are indicated with the same reference numerals plus one hundred respectively, and their overlapped descriptions are eliminated.

In this non-contact position sensor 600, a slider 610 comprises a slider body 612 accommodating a magnet 611 and a shaft 613 extending from the slider body 612 downwardly. Further, in an assist stator 641 as a magnetic flux leakproof member 640, a transverse wall 643 extending from one edge of one opposed wall 642 toward the other opposed wall 644 and another transverse wall 645 extending from one edge of the other opposed wall 644 toward the opposed wall 642 are arranged close to each other through a gap Ga at a midpoint between the opposed walls 642, 644. Additionally, in the assist stator 641, its lower parts extending from the transverse walls 643, 645 to the opposed walls 642, 644 are eliminated.

A hall sensor 631 is arranged in an appropriate position in a gap of a main stator 621, namely, a gap Gm of a main arm 623. For example, in view of arranging the sensor in a position close to a midpoint between both ends of the main stator 621, it is desirable to arrange the sensor 631 in the vicinity of the lower end of the main arm 623 in FIG. 15. In this way, on the ground that the gap of the main stator 621, that is, the gap Gm of the main arm 623 is provided to accommodate the hall sensor 631, it is preferable that the gap Gm is formed to have a clearance as small as it can accommodate the sensor 631 although the gap Gm appears to be remarkably broad in the figure.

The non-contact position sensor 600 like this can detect a position of the magnet 611, namely, both positions of the slider body 612 and the shaft 613 in a non-contact manner since the hall sensor 631 detects magnetic flux corresponding to an entrance percentage of the magnet 611 in entering an area between the opposed walls 622, 624 of the main stator 621, the magnet 611 being movable throughout the area between the opposed walls 622, 624 of the main stator 621 and a sequent area between the opposed walls 642, 644 of the assist stator 641.

Again, this non-contact position sensor 600 is preventive of flux leakage since all flux generated from a part of the magnet 611 entering the area between the opposed walls 622, 624 of the main stator 621 passes trough a magnetic path formed by the main stator 621.

While, since all flux generated from a part of the magnet 611 entering the area between the opposed walls 642, 644 of the assist stator 641 passes through a magnetic path formed by the assist stator 641, flux leakage is prevented as well.

Thus, assuming that the moving direction of the magnet 611 is represented by Z-direction, any offset of the magnet 611 in X-direction or Y-direction perpendicular to the Z-direction would not influence on the magnetic paths, thereby causing no change in detection outputs of the hall sensor 631.

Figure 16:
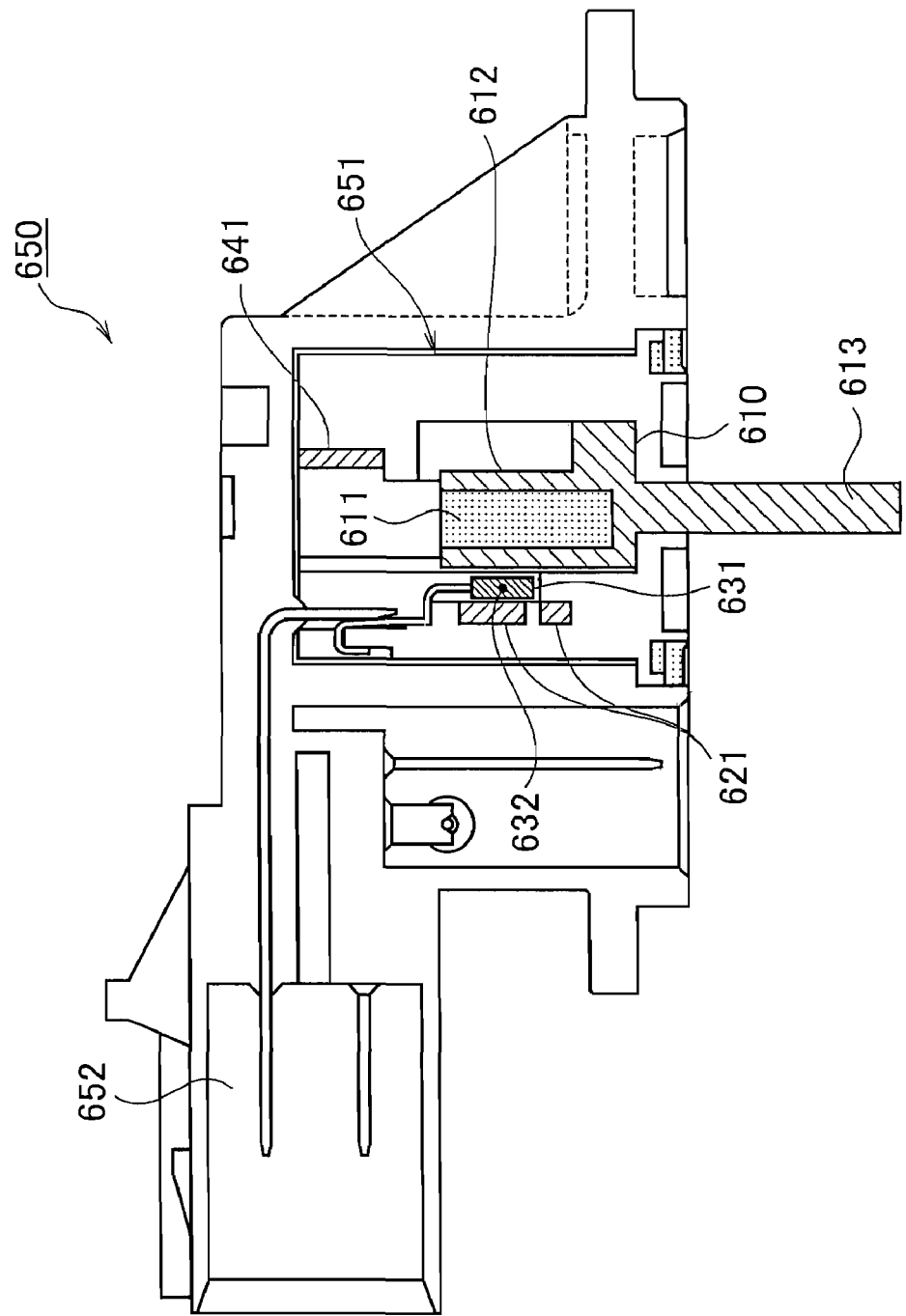
FIG. 16 is a sectional view showing one example of applying the non-contact position sensor of FIG. 15 to a position sensor for EGR valve.

FIG. 16 is a sectional view showing one example where the non-contact position sensor 600 of FIG. 15 is applied to a position sensor for EGR valve. This position sensor 650 for EGR valve includes the main stator 621 and the assist stator 641 held by a stator holder 651 provided in a sensor body. In the sensor 650, since the slider 610 accommodating the magnet 611 moves up and down in the figure, the hall sensor 631 detects, at its detecting position 632, a position of the magnet 611, that is, both positions of the slider body 612 and the shaft 613. In the figure, reference numeral 652 designates a connector terminal for connecting a terminal of the hall sensor 631.

Figure 17:
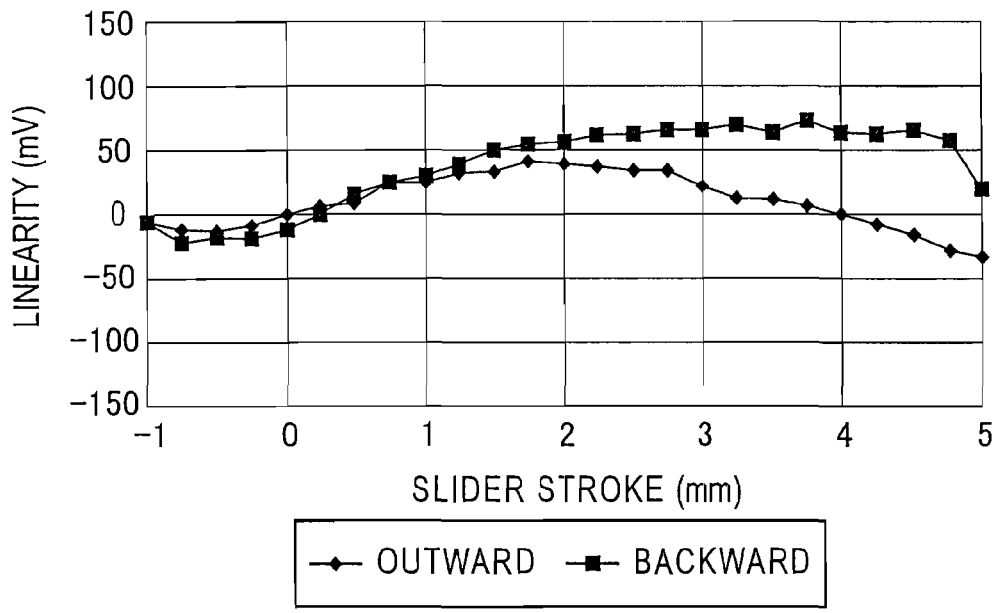
Figure 17:
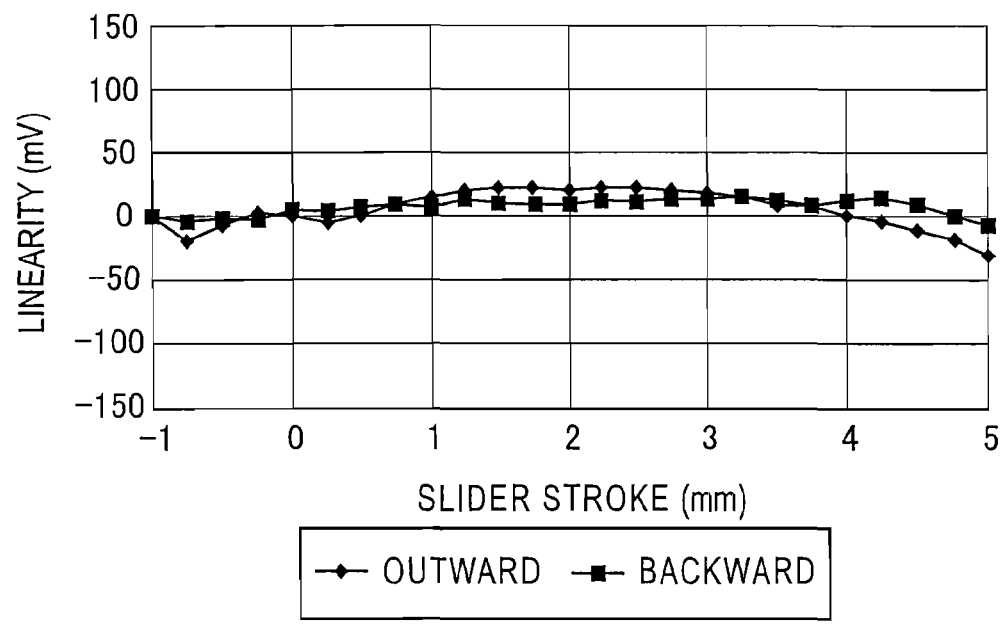

Provided that vertical widths of the main arms 523, 623 are respectively equal to vertical width of the auxiliary arms 525, 625 and are relatively wide (e.g. 4.5 mm) and that intervals between both arms (e.g. 3 mm), FIG. 17 includes graphs showing a comparison of hysteresis characteristics (FIG. 17(a)) of the non-contact position sensor 500 using the integral-type assist stator 541 having no gap Ga with hysteresis characteristics (FIG. 17(b)) of the non-contact position sensor 600 using the separation-type assist stator 641 having the gap Ga (e.g. gap Ga=1.5 mm).

In the sensor using the integral-type assist stator 541 shown in FIG. 17(a), the hysteresis is large within a range of high stroke and the linearity of output is curved in chevron. While, in the sensor using the separation-type assist stator 641 shown in FIG. 17(b), it is found that the hysteresis in a range of high stroke is reduced remarkably and furthermore, the linearity of output is corrected especially in an backward stroke of the slider, while the chevron-shaped characteristics in an outward stroke of the slider still remains.

On condition of employing the separation-type assist stator 641 of FIG. 17(b), FIG. 18 is a graph showing the hysteresis characteristics of the non-contact position sensor 600 where the vertical width of the auxiliary arm 625 is narrowed (e.g. from 4.5 mm to 2 mm). In case of this non-contact position sensor, since the hysteresis drops to go negative in the whole operating range, it is found that an excessive descent in hysteresis occurs. Further, it is also found that there is little or no change in the chevron-shaped characteristics during the outward stroke of the slider.

On condition of employing the separation-type assist stator 641 of FIG. 17(b), FIG. 19 is a graph showing the hysteresis characteristics of the non-contact position sensor 600 where an interval between the main arm 623 and the auxiliary arm 625 is narrowed (e.g. from 3 mm to 2 mm). This non-contact position sensor exhibits a positive hysteresis in the whole operating range and furthermore, a value of hysteresis gets smaller remarkably. Additionally, it is found that the linearity is corrected to change its chevron-shaped characteristics to flat one.

According to the above-mentioned non-contact position sensors 500, 600;

(1) with the use of the assist stators 541, 641, it is possible to prevent flux from leaking out to the outside;

(2) with the use of the assist stators 541, 641, it is possible to detect the positions of the magnets 511, 611 within their entire operation ranges appropriately;

(3) it is possible to provide sensors that are compact in respective moving directions of the magnets 511, 611 in relation to their moving spans;

(4) with the use of the main arms 523, 623 and the auxiliary arms 525, 625, it becomes possible to displace respective detection positions from centers between both ends of the main stators 541, 641, allowing the hall sensors 531, 631 to be arranged in appropriate positions on consideration of convenience of production.

(5) by altering the vertical widths of the auxiliary arms 525, 625 while maintaining constant vertical widths of the main arms 523, 623, it is possible to change a magnitude of hysteresis.

(6) by adjusting an interval between the main arm 523 (623) and the auxiliary arm 525 (625), it is possible to correct and alter output characteristics of the sensor;

(7) by adjusting a balance between the gap Gm of the main stator 521 (621) and the gap Gma formed between the main stator 521 (621) and the assist stator 541 (641), it is possible to correct and alter output characteristics of the sensor;

(8) by determining the presence of the gap Ga of the assist stator 541 (641) and adjusting a clearance of the gap Ga, it is possible to correct and alter output characteristics of the sensor; and (9) since both of the main stator 521 (621) and the assist stator 541 (641) are manufactured by press operations, it is possible to produce the sensor in a low price.

Tendencies of various characteristics mentioned above are shown in FIGS. 20 to 24, in abstraction and summary. FIG. 20 illustrates an influence of the position of each detecting part on linearity, representing that there exists a detecting position exhibiting the best characteristics at the center of the main stator. Additionally, it is found that detecting positions deviated from the center of the main stator represent chevron-shaped characteristics.

FIG. 21 shows a relationship between the position of the detecting part and the hysteresis. From the figure, it is found that if the detecting position is deviated from the center of the main stator, then a gradient of hysteresis changes centering on a center of characteristic range.

FIG. 22 illustrates an influence of the gap Gma between the main stator and the assist stator on linearity. From the figure, it is found that to narrow the gap between the main stator and the assist stator causes both ends of a chevron-shaped linearity to get close to a straight line.

FIG. 23 shows a relationship between the gap between the main stator and the assist stator and the hysteresis, representing that to narrow the gap between the main stator and the assist stator causes the hysteresis to be decreased. From the figure, it is also found that an influence of narrowing gets larger especially in a lower-operating range and in an extreme case, the hysteresis becomes negative.

FIG. 24 shows a relationship between the gap of the assist stator and the hysteresis. From the figure, it is found that the broader the gap of the assist stator gets, the smaller the hysteresis in the entire range gets in parallel translation. If the gap is broadened excessively, the hysteresis becomes negative in the entire range. Additionally, although it is not shown, there is no likelihood of an influence of the gap of the assist stator on the linearity.

Figure 26:
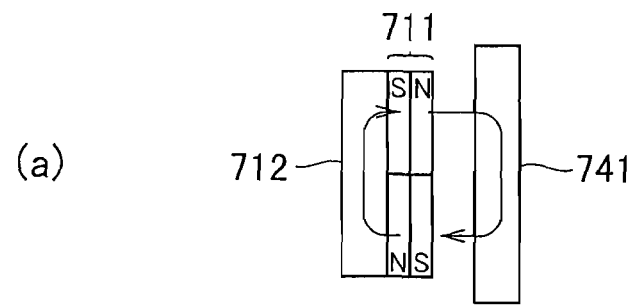
Figure 26:
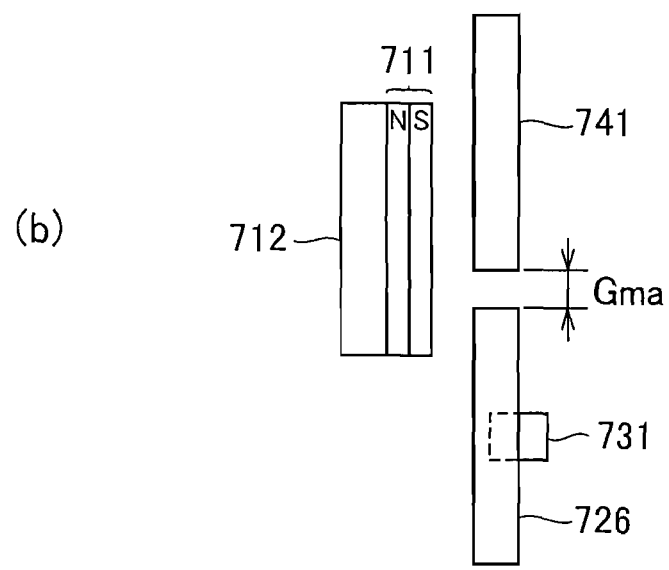
Figure 26:
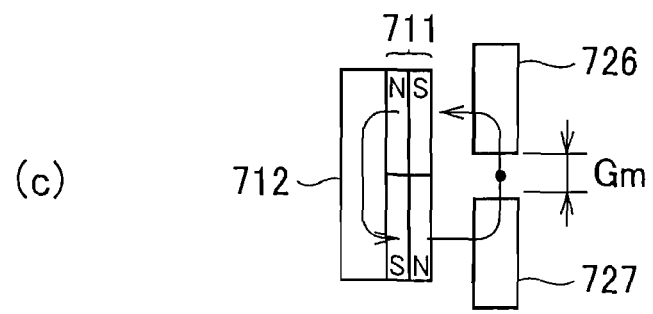

FIG. 25 includes an entire perspective view (FIG. 25(a)) typically showing the non-contact position sensor in accordance with a seventh embodiment of the present invention and a perspective view (FIG. 25(b)) of a substantial part of the sensor. FIG. 26 shows a top view (FIG. 26(a)), a side view (FIG. 26(b)) and a bottom view (FIG. 26(c)) of the sensor.

This non-contact position sensor 700 comprises a substantially-flat slider 710, a substantially-flat main stator 721 as a stator 720, a hall sensor 731 as a magnetically-sensitive sensor 730 and a substantially-flat assist stator 741 as a magnetic flux leakproof member 740.

The slider 710 comprises a magnet 711 and an armature 712 and is constructed so as to move along its longitudinal direction (a vertical direction shown with an arrow of FIG. 25(a)) linearly.

The magnet 711 is composed of a pair of substantially-flat plates which have respective front and back faces of N-pole and S-pole and extend a moving direction of the slider 710 and of whose respective one sides having different polarities are joined to each other side by side.

The magnet 711 like this is arranged on the front side of the slider 710, that is, on a side opposing the main stator 721 and the assist stator 741 through a required clearance. While, on the backside of the slider 710, the armature 712 is arranged in contact with the magnet 711. Therefore, a front face of the magnet 711 opposes the main stator 721 and the assist stator 741, while a back face of the magnet 711 comes in contact with the armature 712.

The main stator 721 consists of magnetic bodies and includes separation walls 726, 727 opposing the magnet 711, which are arranged close to each other through a gap Gm at the center of the stator 721. This gap Gm is formed uniformly between both ends of the main stator 721 (upper and lower ends in FIGS. 25 and 26) along a moving direction of the magnet 711. The main stator 721 like this can be manufactured by pressing e.g. a plate material of magnetic material whose magnetic resistance is as small as possible.

The hall sensor 731 is arranged in an appropriate position in the gap Gm of the main stator 721. For example, it is desirable to arrange the sensor 731 at a midpoint between both ends of the main stator 721 (in FIGS. 25 and 26, at a center level between the upper end and the lower end of the main stator 721). In this way, on the ground that the gap Gm of the main stator 721 is provided to accommodate the hall sensor 731, it is preferable that the gap Gm is formed to have a clearance as small as it can accommodate the sensor 731.

The assist stator 741 consists of a magnetic body and opposes the magnet 711. The assist stator 741 like this can be manufactured by pressing e.g. a plate material of magnetic material whose magnetic resistance is as small as possible.

The main stator 721 and the assist stator 741 are arranged close to each other through a gap Gma along the moving direction of the magnet 711. In FIGS. 25 and 26, since the assist stator 741 is positioned above the main stator 721, a spatial area where the assist stator 741 opposes the magnet 711 is formed above a spatial area where the main stator 721 opposes the magnet 711 continuously.

The non-contact position sensor 700 constructed above can detect a position of the magnet 711 in a non-contact manner since the hall sensor 731 detects magnetic flux corresponding to an entrance percentage of the magnet 711 in entering the area opposed by the main stator 721, the magnet 711 being movable throughout the area opposed by the main stator 721 and the sequent area opposed by the assist stator 741.

Again, this non-contact position sensor 700 is preventive of flux leakage since all flux generated from the front face of a part of the magnet 711 entering the area opposed by the main stator 721 passes trough a magnetic path formed by the main stator 721. At this time, since flux generated from the back face of the same part of the magnet 711 passes through a magnetic path formed by the armature 712, flux leakage is prevented.

While, since all flux generated from the front face of a part of the magnet 711 entering the area opposed by the assist stator 741 passes through a magnetic path formed by the assist stator 741, flux leakage is prevented as well. At this time, since flux generated from the back face of the same part of the magnet 711 passes through a magnetic path formed by the armature 712, flux leakage is prevented.

Thus, assuming that the moving direction of the magnet 711 is represented by Z-direction, any offset of the magnet 711 in X-direction or Y-direction perpendicular to the Z-direction would not influence on the magnetic paths, thereby causing no change in detection outputs of the hall sensor 731.

FIG. 27 includes an entire perspective view (FIG. 27(*a*)) typically showing the non-contact position sensor in accordance with an eighth embodiment of the present invention and a perspective view (FIG. 27(*b*)) of a substantial part of the sensor. In this figure, elements similar to those of FIG. 25 are indicated with the same reference numerals plus one hundred respectively, and their overlapped descriptions are eliminated.

This non-contact position sensor 800 includes a stator 820, a magnetically-sensitive sensor 830 and a magnetic flux leakproof member 840 all arranged inside a slider 810 curved substantially in an arc.

That is, the non-contact position sensor 800 comprises the slider 810, a main stator 821 having a substantially arc-shaped curved face corresponding to an arc shape of the slider 810, a hall sensor 831 and an assist stator 841 having a substantially arc-shaped curved face corresponding to the arc shape of the slider 810.

The non-contact position sensor 800 constructed above can detect a position of the magnet 811 in a non-contact manner since the hall sensor 831 detects magnetic flux corresponding to an entrance percentage of the magnet 811 in entering an area opposed by the main stator 821, the magnet 811 being movable throughout the area opposed by the main stator 821 and a sequent area opposed by the assist stator 841.

Again, this non-contact position sensor 800 is preventive of flux leakage since all flux generated from the front face of a part of the magnet 811 entering the area opposed by the main stator 821 passes through a magnetic path formed by the main stator 821. At this time, since flux generated from the back face of the same part of the magnet 811 passes through a magnetic path formed by an armature 812, flux leakage is prevented.

While, since all flux generated from the front face of a part of the magnet 811 entering the area opposed by the assist stator 841 passes through a magnetic path formed by the assist stator 841, flux leakage is prevented as well. At this time, since flux generated from the back face of the same part of the magnet 811 passes through a magnetic path formed by the armature 812, flux leakage is prevented.

Thus, assuming that the moving direction of the magnet 811 along its arc is represented by Z-direction, any offset of the magnet 811 in X-direction or Y-direction perpendicular to the Z-direction would not influence on the magnetic paths, thereby causing no change in outputs of the hall sensor 831.

FIG. 28 includes an entire perspective view (FIG. 28(*a*)) typically showing the non-contact position sensor in accordance with a ninth embodiment of the present invention, a perspective view (FIG. 28(*b*)) of a substantial part of the sensor and a perspective view (FIG. 28(*c*)) of the substantial part at a different angle. In this figure, elements similar to those of FIG. 27 are indicated with the same reference numerals plus one hundred respectively, and their overlapped descriptions are eliminated.

This non-contact position sensor 900 includes a stator 920, a magnetically-sensitive sensor 930 and a magnetic flux leakproof member 940 all arranged outside a slider 910 curved substantially in an arc.

That is, the non-contact position sensor 900 comprises the slider 910, a main stator 921 which is substantially arc-shaped and curved corresponding to an arc shape of the slider 910, a hall sensor 931 and an assist stator 941 which is substantially arc-shaped and curved corresponding to the arc shape of the slider 910.

The non-contact position sensor 900 constructed above can detect a position of the magnet 911 in a non-contact manner since the hall sensor 931 detects magnetic flux corresponding to an entrance percentage of the magnet 911 in entering an area opposed by the main stator 921, the magnet 911 being movable throughout the area opposed by the main stator 921 and a sequent area opposed by the assist stator 941.

Again, this non-contact position sensor 900 is preventive of flux leakage since all flux generated from the front face of a part of the magnet 911 entering the area opposed by the main stator 921 passes trough a magnetic path formed by the main stator 921. At this time, since flux generated from the back face of the same part of the magnet 911 passes through a magnetic path formed by an armature 912, flux leakage is prevented.

While, since all flux generated from the front face of a part of the magnet 911 entering the area opposed by the assist stator 941 passes through a magnetic path formed by the assist stator 941, flux leakage is prevented as well. At this time, since flux generated from the back face of the same part of the magnet 911 passes through a magnetic path formed by the armature 912, flux leakage is prevented.

Thus, assuming that the moving direction of the magnet 911 along its arc is represented by Z-direction, any offset of the magnet 911 in X-direction or Y-direction perpendicular to the Z-direction would not influence on the magnetic paths, thereby causing no change in outputs of the hall sensor 931.

INDUSTRIAL APPLICABILITY

As mentioned above, the present invention provides a non-contact position sensor where a magnetically-sensitive sensor in the stator detects a position of a slider by an entrance percentage of the slider in entering an area where the slider with a magnet can move while keeping a required clearance against a stator formed by a magnetic body and further, the non-contact position sensor includes a magnetic flux leak-proof member for preventing flux, which is generated from a part of the magnet that does not enter the area, from leaking out to the stator. Therefore, according to the present invention, without adopting a clearance between the moving magnet and the stator as a magnetic path, it is possible to effectively utilize a length of the magnet in the moving direction in order to detect a position of the magnet.

The invention claimed is:

1. A non-contact position sensor comprising:
   a slider having a magnet having a front face along a longitudinal direction of the magnet that has one polarity and a back face along the longitudinal direction of the magnet that has an opposite polarity;
   a main stator consisting of a magnetic body having a first pair of opposed walls forming an area in which the slider enters while keeping a predetermined clearance, the first pair of opposed walls corresponding to the front and back faces of the magnet, and a first gap continuing into the opposed walls;
   a magnetically-sensitive sensor arranged in the first gap to detect a position of the slider corresponding to a percentage of the magnet entering the area; and
   an assist stator for preventing magnetic flux, which is generated in a part of the magnet that does not enter the area, from leaking out to the main stator, wherein
   the assist stator has a second pair of opposed walls corresponding to front and back faces of the part of the magnet that does not enter the area and transverse walls extending from the second pair of opposed walls which are separated from each other through a second gap formed between the transverse walls, wherein
   the first and second gaps are formed uniformly along a moving direction of the slider, respectively.

2. The non-contact position sensor of claim 1, wherein the magnetically-sensitive sensor is provided in a direction perpendicular to a moving direction of the slider.

3. A non-contact position sensor comprising:
   a slider having a magnet having a front face along a longitudinal direction of the magnet that has one polarity and a back face along the longitudinal direction of the magnet that has an opposite polarity;
   a main stator consisting of a magnetic body having a first pair of opposed walls forming a first area in which the slider enters while keeping a predetermined clearance, the first pair of opposed walls corresponding to the front and back faces of the magnet, and a first gap continuing into the opposed walls;
   an assist stator consisting of a magnetic body having a second pair of opposed walls forming a second area which allows the slider to move while keeping a predetermined clearance and transverse walls extending from the second pair of opposed walls which are separated from each other through a second gap formed between the transverse walls, wherein there is a third gap between the assist stator and the main stator; and
   a magnetically-sensitive sensor arranged in the first gap to detect a position of the slider corresponding to a percentage of the magnet entering the first area, wherein
   the first and third gaps are formed uniformly along a moving direction of the slider, respectively.

4. The non-contact position sensor of claim 3, wherein the magnetically-sensitive sensor is provided in a direction perpendicular to a moving direction of the slider.

* * * * *